(12) United States Patent
Hirota

(10) Patent No.: US 8,339,914 B2
(45) Date of Patent: Dec. 25, 2012

(54) DIGITAL BROADCAST RECEIVER

(75) Inventor: Toru Hirota, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 16 days.

(21) Appl. No.: 13/119,338

(22) PCT Filed: Sep. 24, 2009

(86) PCT No.: PCT/JP2009/066521
§ 371 (c)(1),
(2), (4) Date: Mar. 16, 2011

(87) PCT Pub. No.: WO2010/035744
PCT Pub. Date: Apr. 1, 2010

(65) Prior Publication Data
US 2011/0170390 A1    Jul. 14, 2011

(30) Foreign Application Priority Data

Sep. 26, 2008 (JP) .................................. 2008-248510
Sep. 18, 2009 (JP) .................................. 2009-217341

(51) Int. Cl.
*G11B 7/00* (2006.01)
(52) U.S. Cl. ................................................. 369/53.22
(58) Field of Classification Search ................. 369/53.1, 369/53.22, 275.1, 47.1, 47.23, 47.27; 715/738
See application file for complete search history.

(56) References Cited

U.S. PATENT DOCUMENTS 7,774,708 B2 * 8/2010 Bell et al. ...................... 715/738

2003/0021055 A1    1/2003 Tange et al.
2003/0161615 A1    8/2003 Tsumagari et al.
(Continued)

FOREIGN PATENT DOCUMENTS

EP         0 762 422 A2    3/1997
(Continued)

OTHER PUBLICATIONS

European Search Report 09816159.9 dated May 16, 2012.

*Primary Examiner* — Nabil Hindi
(74) *Attorney, Agent, or Firm* — Birch, Stewart, Kolasch & Birch, LLP

(57) ABSTRACT

Provided is a digital broadcast receiver capable of displaying a message, a list of titles of contents or the like together with a viewing screen without interrupting viewing of contents. The digital broadcast receiver includes a controller 25 configured to determine whether an optical disc inserted into the receiver is a read-only optical disc or a recordable optical disc and also to control a display screen. Upon insertion of an optical disc, the controller 25 causes a display screen including a first display area and a second display area to be displayed, the first display area displaying digital broadcast or external input contents, the second display area displaying a message indicating that the optical disc is being prepared. In a case where the optical disc is a read-only optical disc, the controller 25 causes only a playback screen of contents recorded in the optical disc to be displayed upon completion of the preparation of the optical disc. In a case where the optical disc is a recordable disc, the controller 25 causes a list of titles of contents recorded in the optical disc to be further displayed in the second display area, and deletes the message in the second display area upon completion of the preparation of the optical disc.

23 Claims, 20 Drawing Sheets

U.S. PATENT DOCUMENTS

| | | |
|---|---|---|
| 2008/0024664 A1 | 1/2008 | Kimura |
| 2008/0205857 A1 | 8/2008 | Kikkawa et al. |

FOREIGN PATENT DOCUMENTS

| | | |
|---|---|---|
| JP | 2002-269895 A | 9/2002 |
| JP | 2006-86866 A | 3/2006 |
| JP | 2007-142643 A | 6/2007 |
| JP | 2008-72222 A | 3/2008 |
| JP | 2009-284165 A | 12/2009 |

* cited by examiner

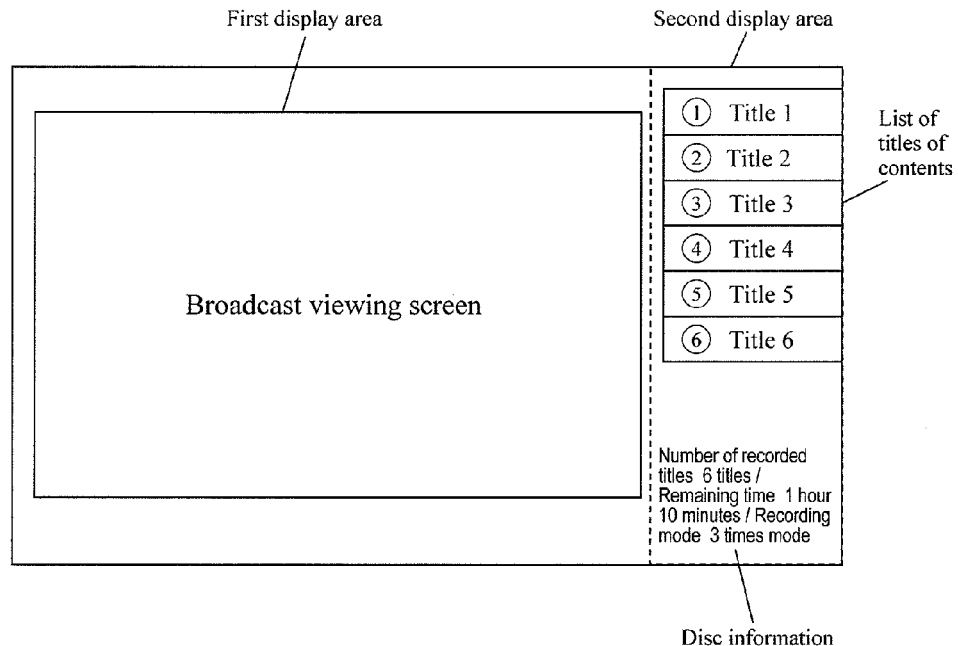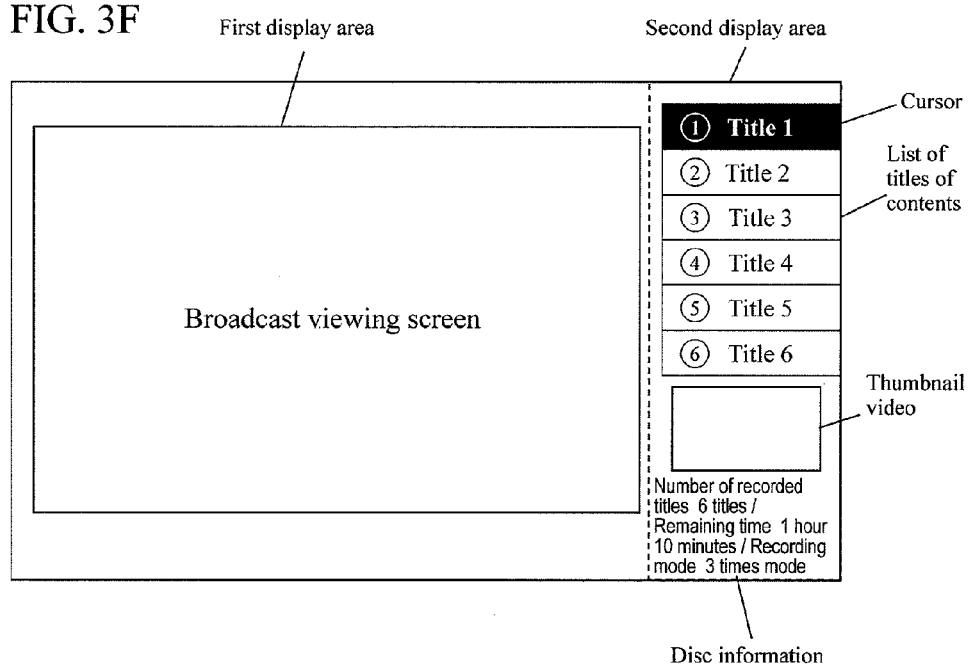

DIGITAL BROADCAST RECEIVER

TECHNICAL FIELD

The present invention relates to a digital broadcast receiver.

BACKGROUND ART

In recent years, among digital broadcast receivers for receiving and displaying digital broadcast, there have been introduced receivers having functions to record contents in a recording medium or an external storage device and also to play back contents recorded in a recording medium or an external recording device. Here, examples of the recording medium include a DVD-R, DVD-RW, Blu-ray Disc, hard disk (HDD), memory card and the like.

When an optical disc such as a DVD-R, DVD-RW or Blu-ray Disc is used, reading of disc information or the like is required. Accordingly, a predetermined waiting time is needed before the contents recorded in the optical disc are ready for playback after the optical disc is inserted into the digital broadcast receiver.

Here, a message informing the user that the optical disc is being prepared is preferably displayed. However, if the message alone is displayed, broadcast contents, external input or the like cannot be viewed during the entire waiting time.

As a means for displaying the message simultaneously with the viewing screen, there is functionality called OSD (On Screen Display) as described in Patent Document 1, for example. Among the conventional digital broadcast receivers, some receivers are configured to display the message indicating that the disc is being prepared on the screen as an OSD during the waiting time. In this manner, broadcast contents, external input or the like can be viewed during the waiting time.

In addition, some receivers are configured to display, when a recordable optical disc including contents already recorded therein is inserted, a list of titles of contents recorded in the optical disc on the screen as an OSD.

PRIOR ART DOCUMENT

Patent Document

Patent Document 1: Japanese Patent Application Publication No. 2008-72222

SUMMARY OF THE INVENTION

Problems to be Solved by the Invention

The conventional digital broadcast receivers described above have the following problem. When an optical disc is inserted during viewing of contents, the message indicating that the optical disc is being prepared is displayed to overlap the viewing screen, and thus interrupts the viewing of contents. In addition, the same problem occurs with a recordable medium when a list of titles of contents recorded in the medium is displayed on the screen as an OSD in the manner described above.

The present invention has been made in consideration of the aforementioned background and thus provides a digital broadcast receiver capable of displaying a message, a list of titles of contents or the like together with the viewing screen without interrupting viewing of contents.

Means for Solving the Problems

The digital broadcast receiver according to the present invention is characterized in that, when an optical disc is inserted into the receiver, a display screen of a double-screen configuration including a first display area and a second display area is displayed. Here, the first display area displays digital broadcast or external input contents, and the second display area displays a message indicating that the optical disc is being prepared. In this manner, the message can be displayed simultaneously with displayed contents without interrupting viewing of the displayed contents.

Specifically, the digital broadcast receiver of the present invention is a digital broadcast receiver capable of recording and playing back contents in an optical disc, characterized in that the receiver comprises a controller configured to determine whether an optical disc inserted into the receiver is a read-only optical disc or a recordable optical disc and also to control a display screen. When an optical disc is inserted, the controller causes a display screen including a first display area and a second display area to be displayed, the first display area displaying digital broadcast or external input contents, the second display area displaying a message indicating that the optical disc is being prepared; and in a case where the optical disc is a read-only optical disc, the controller causes only a playback screen of contents recorded in the optical disc to be displayed upon completion of the preparation of the optical disc.

Another digital broadcast receiver of the present invention is a digital broadcast receiver capable of recording and playing back contents in an optical disc, characterized in that the receiver comprises a controller configured to determine whether an optical disc inserted into the receiver is a read-only optical disc or a recordable optical disc and also to control a display screen. When an optical disc is inserted, the controller causes a display screen including a first display area and a second display area to be displayed, the first display area displaying digital broadcast or external input contents, the second display area displaying a message indicating that the optical disc is being prepared; in a case where the optical disc is a recordable disc, the controller causes a list of titles of contents recorded in the optical disc to be further displayed in the second display area; and the controller deletes the message in the second display area upon completion of the preparation of the optical disc.

Yet another digital broadcast receiver of the present invention is a digital broadcast receiver capable of recording and playing back contents in an optical disc, characterized in that the receiver comprises a controller configured to determine whether an optical disc inserted into the receiver is a read-only optical disc or a recordable optical disc and also to control a display screen. When an optical disc is inserted, the controller causes a display screen including a first display area and a second display area to be displayed, the first display area displaying digital broadcast or external input contents, the second display area displaying a message indicating that the optical disc is being prepared; in a case where the optical disc is a read-only optical disc, the controller causes only a playback screen of contents recorded in the optical disc to be displayed upon completion of the preparation of the optical disc; in a case where the optical disc is a recordable disc, the controller causes a list of titles of contents recorded in the optical disc to be further displayed in the second display area; and the controller deletes the message in the second display area upon completion of the preparation of the optical disc.

The receiver may be configured so that when a predetermined title of contents is selected from the list of titles of contents displayed in the second display area, only a display screen of the content of the selected title is displayed.

A cursor may be displayed in the list of titles of contents displayed in the second display area, and a thumbnail video of the contents of the title on which the cursor is placed may be further displayed in the second display area.

An external appearance of the list of titles of contents to be displayed in the second display area may be changed on the basis of an identification ID recorded in the optical disc.

Another aspect of the digital broadcast receiver of the present invention provides a digital broadcast receiver characterized in that a screen is displayed while being switched between a first display mode and a second display mode, the first display mode displaying a viewing screen of a broadcast program or a playback screen of contents in full screen, the second display mode displaying a display screen including a first display area and a second display area other than the first display area, the first display area displaying the viewing screen of the broadcast program or the playback screen of contents in a reduced size.

Yet another aspect of the digital broadcast receiver of the present invention provides a digital broadcast receiver capable of recording and playing back contents in a built-in storage device and/or a connected external storage device, characterized in that: a screen is displayed while being switched between a first display mode and a second display mode, the first display mode displaying a viewing screen of a broadcast program or a playback screen of contents in full screen, the second display mode displaying a display screen including a first display area and a second display area other than the first display area, the first display area displaying the viewing screen of the broadcast program or the playback screen of contents in a reduced size; in the second display mode, a list of titles of contents recorded in the storage device is displayed in the second display area; and a playback screen of the contents of the title selected from the list of titles of contents is displayed in the first display mode.

Information on the storage device may be further displayed in the second display area.

A thumbnail video of the playback screen of the contents recorded in the storage device may be further displayed in the second display area.

Yet another aspect of the digital broadcast receiver of the present invention provides a digital broadcast receiver capable of playing back a read-only optical disc, characterized in that: a screen is displayed while being switched between a first display mode and a second display mode, the first display mode displaying a viewing screen of a broadcast program or a playback screen of contents in full screen, the second display mode displaying a display screen including a first display area and a second display area other than the first display area, the first display area displaying the viewing screen of the broadcast program or the playback screen of contents in a reduced size; upon insertion of a read-only optical disc, the screen is displayed in the second display mode, so that until the preparation of the playback is completed, a viewing screen of a broadcast program or a content screen which is displayed in the first display mode before the optical disc is inserted is displayed in the first display area, while a message indicating that the optical disc is being read is displayed in the second display area; and upon completion of the preparation of playback of the read-only optical disc, a playback screen of the read-only optical disc is displayed in the first display area, and a thumbnail video of the viewing screen of the broadcast program is displayed in the second display area.

Yet another aspect of the digital broadcast receiver of the present invention provides a digital broadcast receiver capable of recording and playing back contents in an optical disc, characterized in that: a screen is displayed while being switched between a first display mode and a second display mode, the first display mode displaying a viewing screen of a broadcast program or a playback screen of contents in full screen, the second display mode displaying a display screen including a first display area and a second display area other than the first display area, the first display area displaying the viewing screen of the broadcast program or the playback screen of contents in a reduced size; when a predetermined user operation is performed on a remote controller or a main body operation unit in a state where the optical disc including contents recorded therein is inserted, the screen is displayed in the second display mode, so that a viewing screen of a broadcast program or a content screen which is displayed in the first display mode before the user operation is performed is displayed in the first display area, while a list of titles of contents recorded in the optical disc is displayed in the second display area; and a playback screen of the contents of the title selected from the list of titles of contents is displayed in the first display mode.

Information on the optical disc may be further displayed in the second display area.

A thumbnail video of the playback screen of contents recorded in the optical disc may be further displayed in the second display area.

Yet another aspect of the digital broadcast receiver of the present invention provides a digital broadcast receiver capable of recording and playing back contents in a connected external storage device, characterized in that: a screen is displayed while being switched between a first display mode and a second display mode, the first display mode displaying a viewing screen of a broadcast program or a playback screen of contents in full screen, the second display mode displaying a display screen including a first display area and a second display area other than the first display area, the first display area displaying the viewing screen of the broadcast program or the playback screen of contents in a reduced size; when a predetermined user operation is performed on a remote controller or a main body operation unit in a state where the storage device including contents recorded therein is connected, the screen is displayed in the second display mode, so that a viewing screen of a broadcast program or a content screen which is displayed in the first display mode before the user operation is performed is displayed in the first display area, while a list of titles of contents recorded in the storage device is displayed in the second display area; and a playback screen of the contents of the title selected from the list of titles of contents is displayed in the first display mode.

Information on the storage device may be further displayed in the second display area.

A thumbnail video of the playback screen of contents recorded in the storage device may be displayed in the second display area.

Yet another aspect of the digital broadcast receiver of the present invention provides a digital broadcast receiver capable of recording and playing back contents in a built in or connected storage device, characterized in that: a screen is displayed while being switched between a first display mode and a second display mode, the first display mode displaying a viewing screen of a broadcast program or a playback screen of contents in full screen, the second display mode displaying a display screen including a first display area and a second display area other than the first display area, the first display area displaying the viewing screen of the broadcast program or the playback screen of contents in a reduced size; when the storage device including contents recorded therein is started, the screen is displayed in the second display mode, so that a playback screen of the contents selected from the contents recorded in the storage device is displayed in the first display area, while a thumbnail video of the viewing screen of the broadcast program or the content screen which is displayed in the first display mode before the storage device is started is displayed in the second display area.

A list of titles of contents recorded in the storage device may be further displayed in the second display area.

Information on the storage device may be further displayed in the second display area.

Yet another aspect of the digital broadcast receiver of the present invention provides a digital broadcast receiver capable of recording and playing back contents in an optical disc, characterized in that: a screen is displayed while being switched between a first display mode and a second display mode, the first display mode displaying a viewing screen of a broadcast program or a playback screen of contents in full screen, the second display mode displaying a display screen including a first display area and a second display area other than the first display area, the first display area displaying the viewing screen of the broadcast program or the playback screen of contents in a reduced size; and upon insertion of an optical disc, the screen is displayed in the second display mode, so that until preparation of playback or recording is completed, the viewing screen of the broadcast program or the content screen which is displayed in the first display mode before the optical disc is inserted is displayed in the first display area, while a message indicating that the optical disc is being read and information on the broadcast program or the contents displayed in the first display area are displayed in the second display area.

Effects of the Invention

The digital broadcast receiver of the present invention is capable of displaying a message, a list of titles of contents or the like together with the viewing screen without interrupting viewing of contents.

BRIEF DESCRIPTION OF THE DRAWINGS

FIG. 3A to FIG. 3F are display screen examples of the digital broadcast receiver of the present invention.

Figure 1:
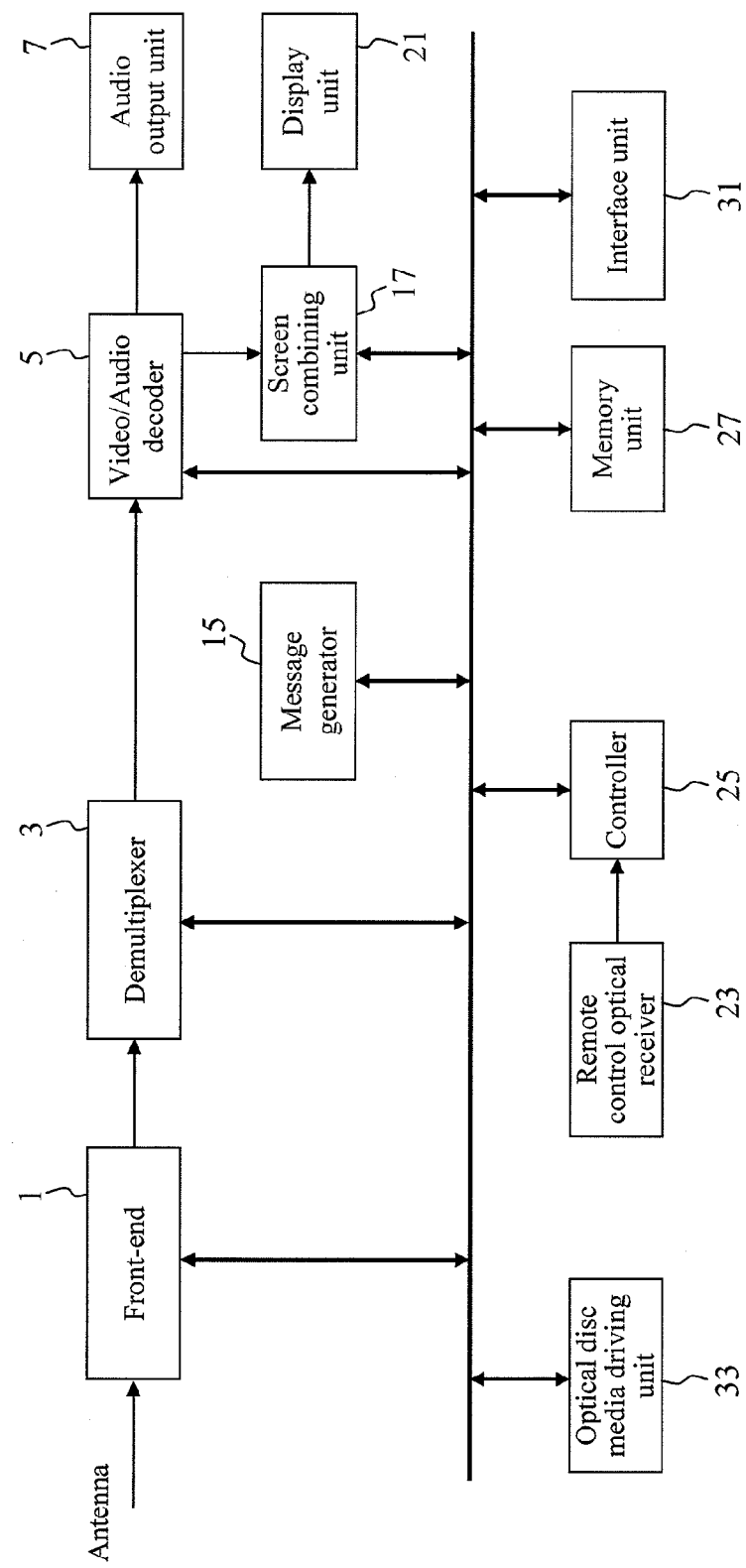
FIG. 1 is a block diagram showing an example of a configuration of a digital broadcast receiver of the present invention.

EXPLANATION OF REFERENCE NUMERALS 1 front-end
3 demultiplexer
5 video/audio decoder
7 audio output unit
15 message generator
17 screen combining unit
21 display unit
23 remote control optical receiver
25 controller
27 memory unit
31 interface unit
33 optical disc media driving unit
35 hard disk
37 flash memory

MODES FOR CARRYING OUT THE INVENTION

First Embodiment

Hereinafter, a digital broadcast receiver according to an embodiment of the present invention will be described with reference to the drawings. FIG. 1 is a block diagram showing an example of a configuration of the digital broadcast receiver of the present embodiment. The digital broadcast receiver shown in FIG. 1 is a digital television receiver including a recording and playing back function, which is a so-called recorder built-in television apparatus, but the present invention is not limited to such a recorder built-in apparatus.

As illustrated in FIG. 1, the digital broadcast receiver according to the embodiment of the present invention includes: a front-end 1 configured to perform processing such as receiving a digital broadcast signal received by an antenna and thereby selecting a station; a demultiplexer 3; a video/audio decoder 5 configured to decode output from the demultiplexer 3; a screen combining unit 17 configured to generate a signal for combining a decoded video signal with a later described message and a list of titles of contents and displaying the resultant screen; a display unit 21 based on the signal combined by the screen combining unit 17; and an audio output unit 7 configured to output audio.

The digital broadcast receiver further includes a message generator 15 configured to generate a message indicating that the optical disc is being prepared, and a list of titles of contents recorded in the optical disc.

In addition, the digital broadcast receiver includes an interface unit 31 configured to form an interface with other external devices; a remote control optical receiver 23 configured to receive a remote control signal from a remote controller, which is a control device; an optical disc media driving unit 33 configured to record and play back broadcast contents or the like by driving an optical disc; a controller (CPU) 25 configured to perform overall control; and a memory unit (RAM/ROM) 27 configured to store therein an application program executed by the controller 25 for performing various types of processing, and to load and provide the program to the CPU.

With the aforementioned configuration, the digital broadcast receiver is capable of displaying contents such as digital broadcast, and contents recorded in an optical disc.

Figure 2:
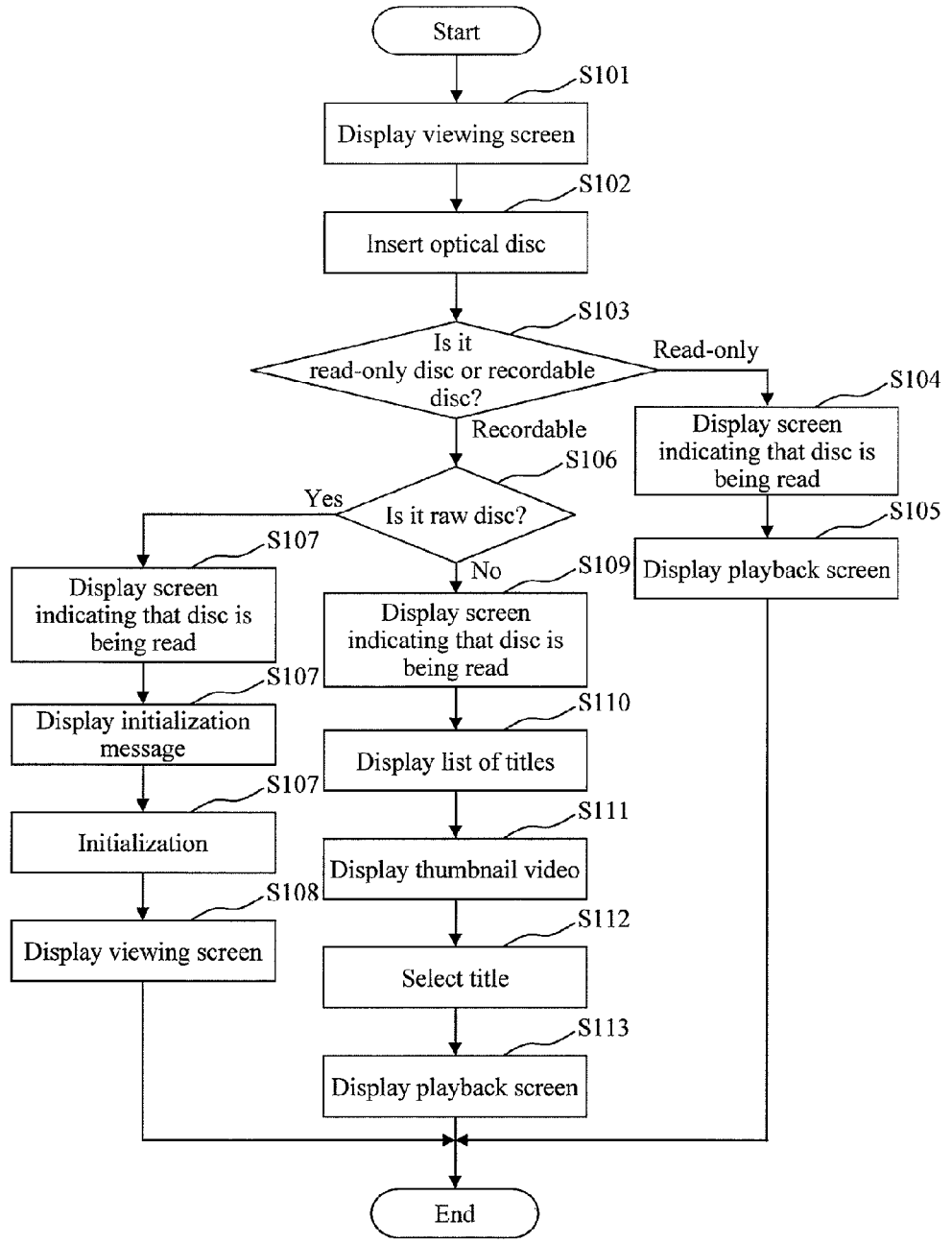
FIG. 2 is a flowchart for describing a flow of processing performed in the digital broadcast receiver of the present invention when an optical disc is inserted into the receiver.

FIG. 2 is a flowchart for describing a flow of processing performed in the digital broadcast receiver of the present invention when an optical disc is inserted into the receiver.

The processing will be described by also referring to the display screen examples shown in FIG. 3A to 3F.

Figure 3A:
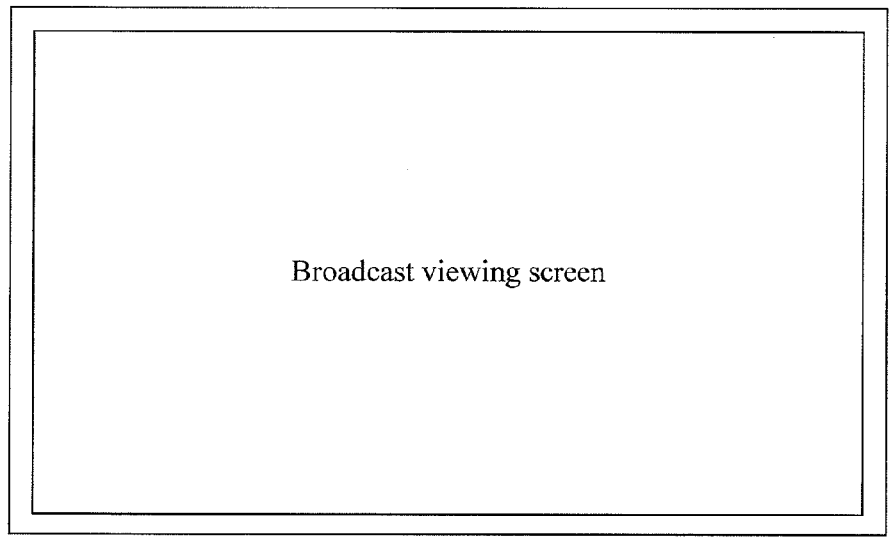

In step S101, suppose that the display unit 21 displays a viewing screen of digital broadcast with a single screen configuration as shown in FIG. 3A, for example. In step S102, an optical disc is inserted into the optical disc media driving unit 33, and reading of disc information or the like is performed. In step S103, the controller 25 determines on the basis of the disc information whether the inserted optical disc is a read-only disc or a recordable disc. If the optical disc is a read-only optical disc, the processing proceeds to step S104. If the optical disc is a recordable optical disc, the processing proceeds to step S106.

Figure 3B:
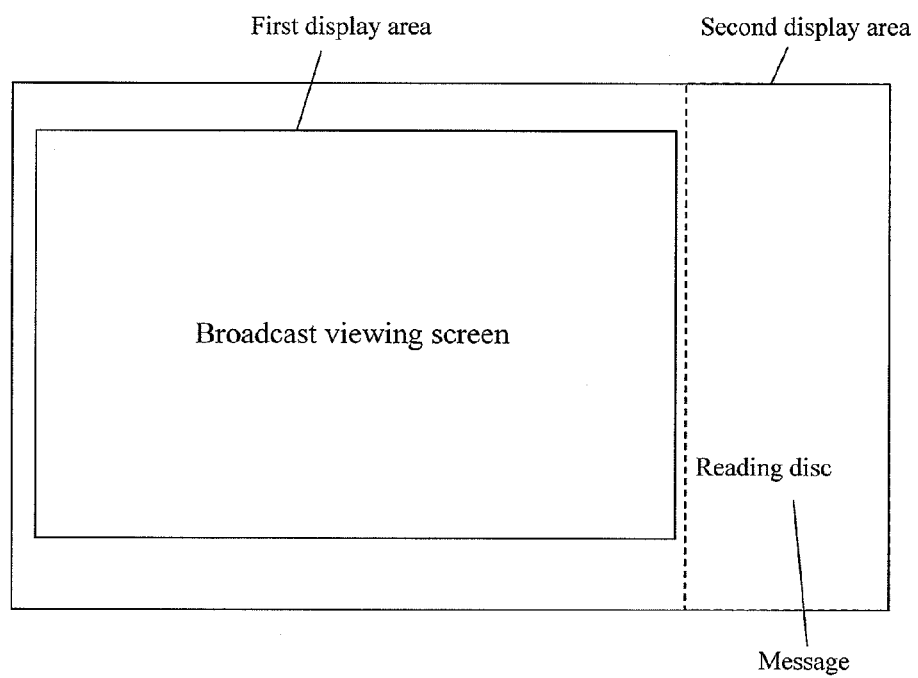
Figure 3C:
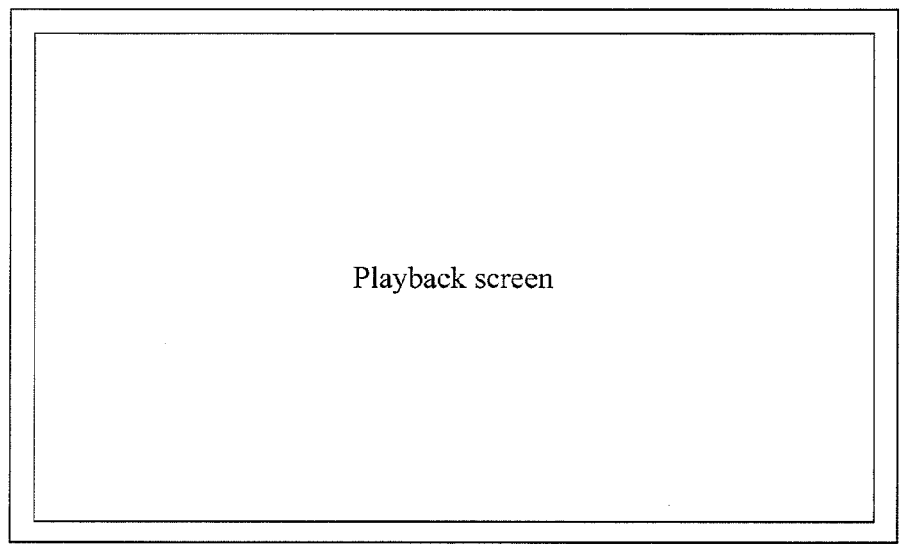

If the inserted optical disc is a read-only optical disc, the controller 25 causes the screen combining unit 17 to form a display screen of a double-screen configuration including a first display area and a second display area and causes the display unit 21 to display the display screen in step S104. Here, the first display area displays a viewing screen of digital broadcast in a reduced size, and the second display area displays a message indicating that the optical disc is being prepared, the message generated by the message generator 15. An example of this display screen is shown in FIG. 3B. Upon completion of the preparation for playback of the optical disc, in step S105, the controller 25 causes the display unit 21 to display a playback screen of the optical disc with the single screen configuration as shown in FIG. 3C and ends the processing.

In a case where the inserted optical disc is a recordable optical disc, the controller 25 determines in step S106 whether or not the optical disc is an uninitialized raw disc. If the inserted optical disc is a raw disc, the processing proceeds to step S107. If the inserted optical disc is not a raw disc, the processing proceeds to step S109.

If the inserted optical disc is a raw disc of a recordable optical disc, the controller 25 causes the screen combining unit 17 to form a display screen of a double-screen configuration including a first display area and a second display area and causes the display unit 21 to display the display screen in step S107. Here, the first display area displays a viewing screen of digital broadcast in a reduced size, and the second display area displays a message indicating that the optical disc is being prepared, the message generated by the message generator 15. This display screen may be the same as the one displayed in step S104, which is shown in FIG. 3B. In step S105, a message for the user to check whether or not to initialize the optical disc is displayed in the second display area. When an instruction to initialize the optical disc is issued by operation of a cursor button of a remote controller or the like, the optical disc is initialized in step S107. During the initialization, a message indicating that the optical disc is being formatted may be displayed in the second display area. Upon completion of the formatting of the optical disc, in step S108, the controller 25 causes the display unit 21 to again display the viewing screen of digital broadcast with the single screen configuration as shown in FIG. 3A and ends the processing.

Figure 3D:
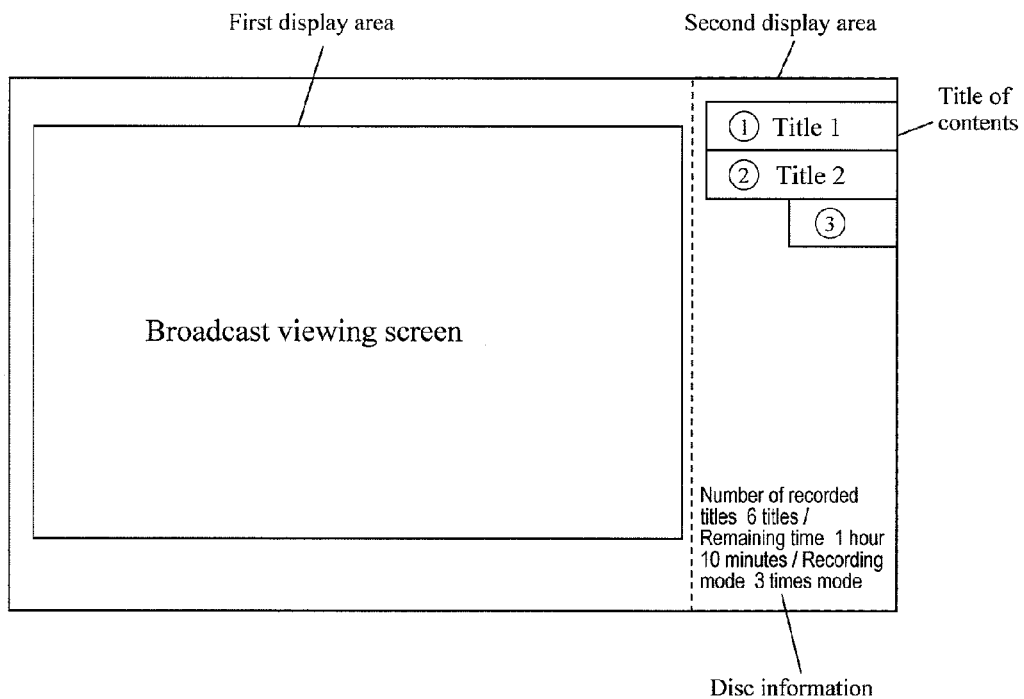

If the inserted optical disc is a recordable optical disc including contents already recorded therein, the controller 25 causes the screen combining unit 17 to form a display screen of a double-screen configuration including a first display area and a second display area and causes the display unit 21 to display the display screen in step S109. Here, the first display area displays a viewing screen of digital broadcast in a reduced size, and the second display area displays a message indicating that the optical disc is being prepared, the message generated by the message generator 15. This display screen may be the same as the one displayed in step S104, which is shown in FIG. 3B. In step S110, the titles of contents recorded in the optical disc are read and displayed in the second display area. Here, the titles of all of the contents recorded in the optical disc may be read first and then be displayed simultaneously. Otherwise, the titles of contents may be displayed one by one in the read order. In addition, when the individual titles of contents are displayed, each of the titles may be added an effect so that the title can be displayed as if it is inserted from the right side of the screen as illustrated in FIG. 3D. Such an effect, display color, character size or the like may be set to be changeable based on an identification ID that can be set on the disc for each user. FIG. 3E shows an example of a display screen in which the titles of all of the contents are displayed. In a case where the same contents are recorded weekly, the contents may be collectively displayed as a single title. In addition, as shown in FIG. 3D and FIG. 3E, disc information such as the number of titles of recorded contents, the remaining time or the like may be displayed in the second display area.

In the state shown in FIG. 3E, the cursor can be placed on the individual titles of the contents by operation of the cursor button on the remote controller or the like. In step S111, the controller 25 causes a playback screen of a title of contents on which the cursor is placed to be displayed in the second display area as a thumbnail video. In this manner, the user can check the contents of the title. FIG. 3F shows an example of the display screen in this state. In the second display area, other than the thumbnail video, contents related information recorded while recording the contents may be displayed, or related contents may be displayed by EPG.

In step S112, when the user pushes a set button of the remote controller, for example, in a state where the cursor is placed on the desired title of contents, the desired title of contents is selected. In step S113, the controller 25 causes the playback screen of the contents of the selected title to be displayed with a single screen configuration as shown in FIG. 3C and ends the processing. As shown in the examples in FIG. 3E and FIG. 3F, a number may be assigned to each title of contents so as to allow the user to directly select the desired title of contents by pushing a numeric key on the remote controller.

In the manner described above, when an optical disc is inserted, a message indicating that the optical disc is being prepared can be displayed simultaneously with the displayed contents without interrupting the viewing of the displayed contents.

In a case where a recordable optical disc is inserted, a recording button or the like to record the contents being displayed in the first display area may be displayed in the second display area.

In addition, in the examples shown in FIG. 3A to FIG. 3F, the second display area is displayed on the right side of the first display area, but the second display area may be displayed on any of the top, bottom, left or right side of the first display area.

Second Embodiment

In the first embodiment, the processing to be performed when an optical disc is inserted has been described. Meanwhile, in a second embodiment, a description is given of a case where contents are recorded in a storage device such as a built-in hard disk, a hard disk connected via USB or Ethernet (registered trademark) or a flash memory connected via USB. The second embodiment can be carried out simultaneously with the first embodiment.

Figure 4:
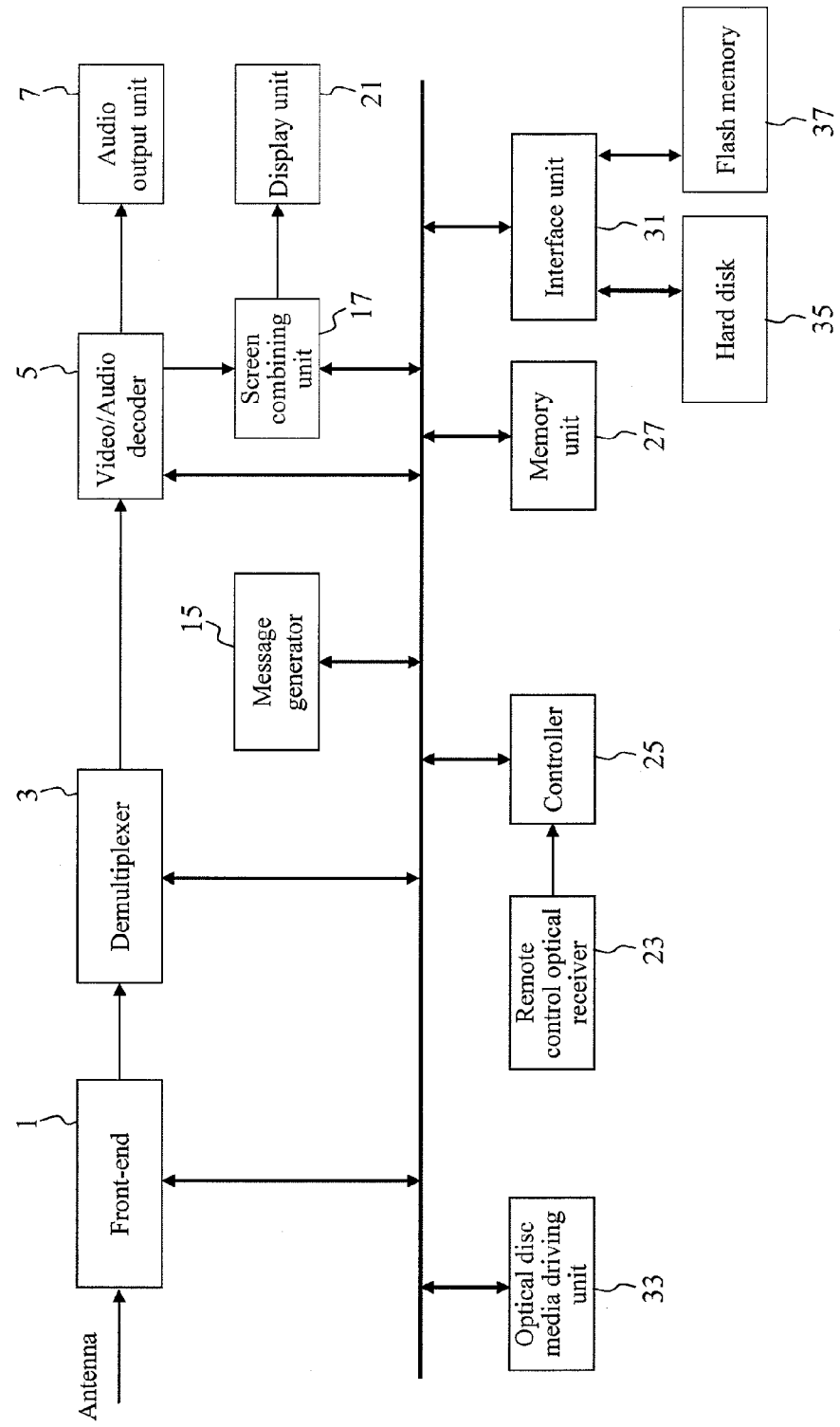
FIG. 4 is a block diagram showing another example of a configuration of a digital broadcast receiver of the present invention.

FIG. 4 is a block diagram showing another example of a configuration of a digital broadcast receiver of the present embodiment. The digital broadcast receiver shown in FIG. 4 is a digital television receiver including a recording and playing back function, which is a so-called recorder built-in television apparatus, but the present invention is not limited to such a recorder built-in apparatus.

As illustrated in FIG. 4, like the digital broadcast receiver according to the first embodiment illustrated in FIG. 1, the digital broadcast receiver according to the second embodiment of the present invention includes: a front-end 1 configured to perform processing such as receiving a digital broadcast signal received by an antenna and thereby selecting a station; a demultiplexer 3; a video/audio decoder 5 configured to decode output from the demultiplexer 3; a screen combining unit 17 configured to generate a signal for combining and displaying a decoded video signal with a later described message and a list of titles of contents; a display unit 21 based on the signal combined by the screen combining unit 17; and an audio output unit 7 configured to output audio.

The digital broadcast receiver further includes a message generator 15 configured to generate a message indicating that the optical disc is being prepared, and a list of titles of contents recorded in the optical disc and the storage device.

In addition, the digital broadcast receiver includes an interface unit 31 configured to form an interface with other external devices; a remote control optical receiver 23 configured to receive a remote control signal from a remote controller, which is a control device; an optical disc media driving unit 33 configured to record and play back broadcast contents or the like by driving an optical disc; a controller (CPU) 25 configured to perform overall control; and a memory unit (RAM/ROM) 27 configured to store therein an application program executed by the controller 25 for performing various types of processing, and to load and provide the program to the CPU.

In addition to the same components as those of the digital broadcast receiver according to the first embodiment described above, the digital broadcast receiver according to the second embodiment includes a hard disk 35 and a flash memory 37 which are connected to the interface unit 31. The hard disk 35 may be a hard disk built in the digital broadcast receiver, or a hard disk connected to the digital broadcast receiver via USB, Ethernet (registered trademark) or the like. The flash memory 37 can be in any form. Moreover, the hard disk 35 and the flash memory 37 are only examples of the storage device. Thus, any storage device can be used as long as the storage device is capable of recording contents therein.

With the aforementioned configuration, contents such as digital broadcast or contents recorded in an optical disc, a hard disk or a flash memory can be displayed, for example.

Figure 5:
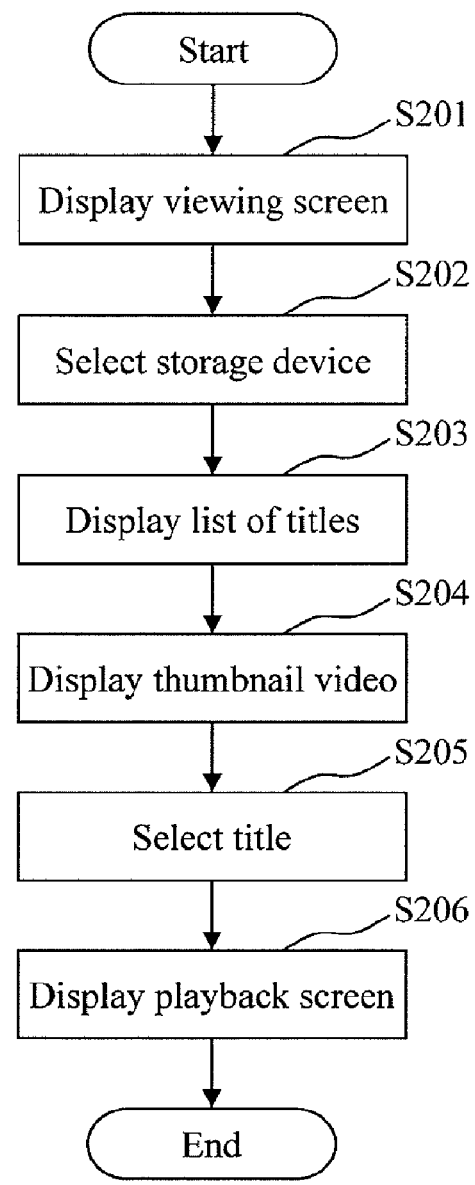
FIG. 5 is a flowchart for describing a processing flow in a second embodiment.

FIG. 5 is a flowchart for describing a flow of processing to be performed when a content name list of contents recorded in a storage device is displayed in the digital broadcast receiver according to the second embodiment of the invention. The processing will be described by also referring to the display screen examples shown in FIG. 6A to FIG. 6D.

Figure 6A:
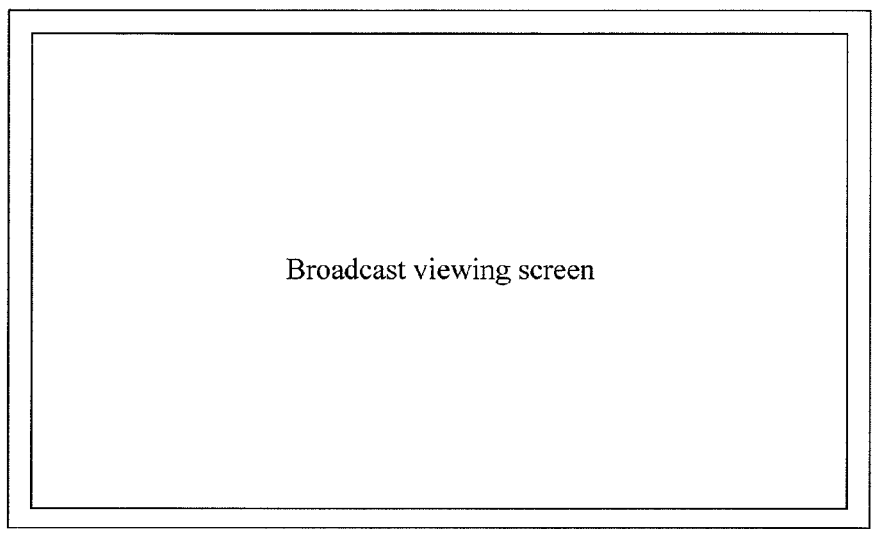
FIG. 6A to FIG. 6D are display screen examples in the second embodiment.
Figure 6B:
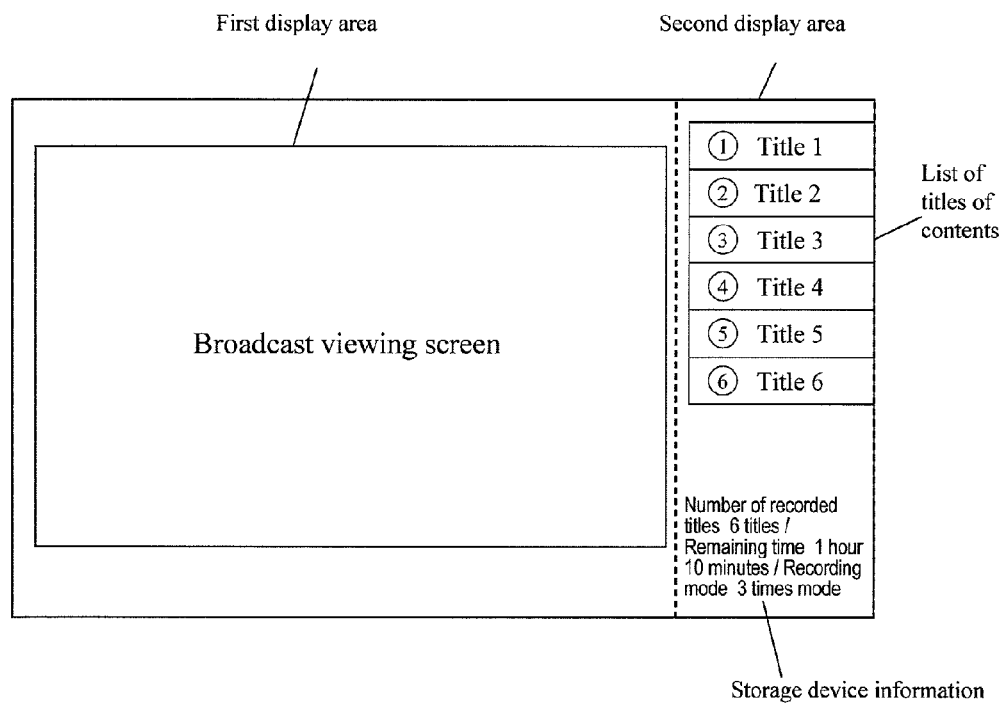

In step S201, suppose that the display unit 21 displays a viewing screen of digital broadcast with a single screen configuration as shown in FIG. 6A, for example. In step S202, a storage device for which a content list is to be displayed is selected. Here, the storage device can be selected by use of various methods including a selection method by pushing a key assigned to each storage device on the remote controller, a selection method by pushing a predetermined key (such as MENU key) on the remote controller to display a selection screen and then to make a selection by operation of a cursor key, and a selection method by connecting a storage device to the digital broadcast receiver. In step S203, the controller 25 reads titles of contents recorded in the selected storage device and causes the screen combining unit 17 to form a display screen of a double-screen configuration including a first display area and a second display area and then causes the display unit 21 to display the display screen. Here, the first display area displays a viewing screen of digital broadcast in a reduced size, and a second display area displays a list of the read titles of the contents. FIG. 6B shows an example of the display screen. As shown in FIG. 6B, information on the storage device such as the number of titles of recorded contents, the remaining time or the like may be displayed in the second display area.

Figure 6C:
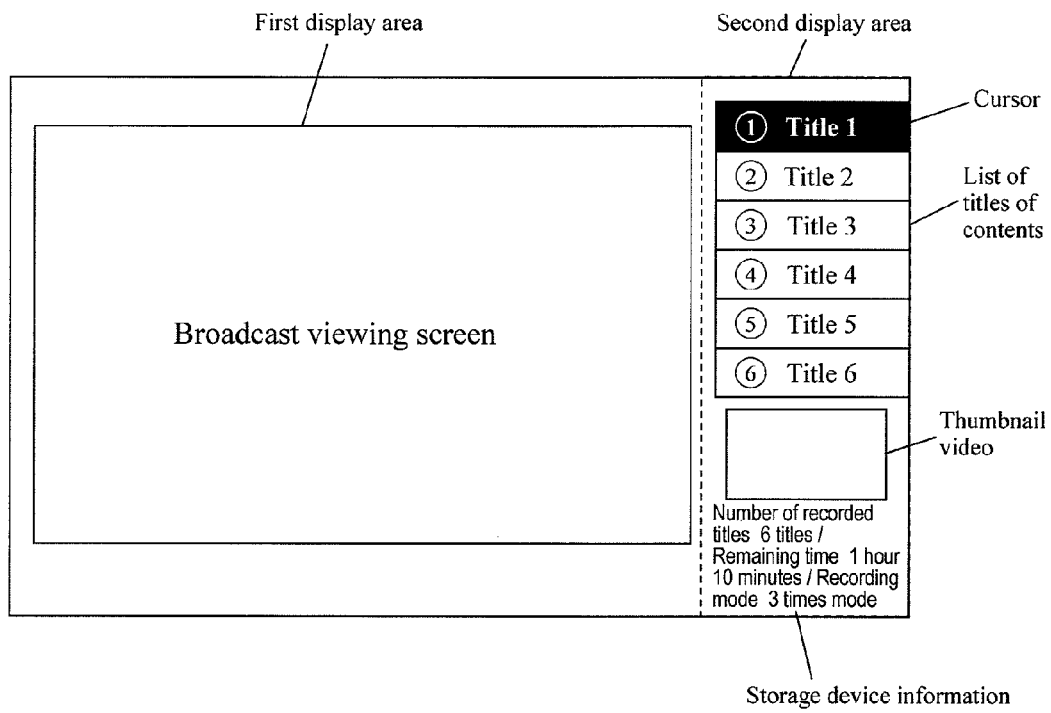

In the state shown in FIG. 6B, the cursor can be placed on the individual titles of the contents by operation of the cursor button on the remote controller or the like. In step S204, the controller 25 causes a playback screen of the contents of the title on which the cursor is placed to be displayed in the second display area as a thumbnail video. In this manner, the user can check the contents of the title. FIG. 6C shows an example of the display screen in this state. In the second display area, other than the thumbnail video, contents related information recorded while recording the contents may be displayed, or related contents may be displayed by EPG.

Figure 6D:
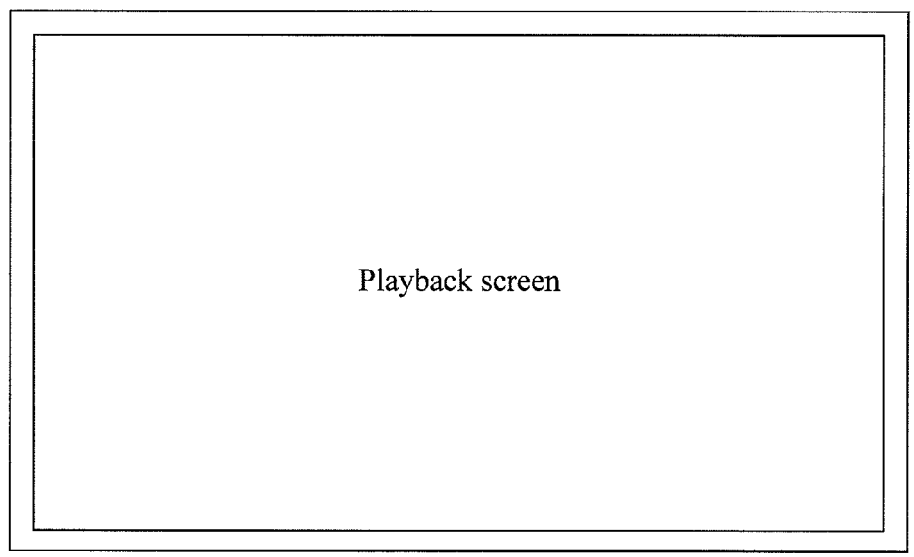

In step S205, when the user pushes a set button of the remote controller, for example, in a state where the cursor is placed on the desired title of contents, the desired title of contents is selected. In step S206, the controller 25 causes the playback screen of the contents of the selected title to be displayed with a single screen configuration as shown in FIG. 6D and ends the processing. As shown in the examples in FIG. 6B and FIG. 6C, a number may be assigned to each title of contents so as to allow the user to directly select the desired title of contents by pushing a numeric key on the remote controller.

In a case where a recordable storage device is connected, a recording button or the like to record the contents being displayed in the first display area may be displayed in the second display area.

In addition, in the examples shown in FIG. 6A to FIG. 6D, the second display area is displayed on the right side of the first display area, but the second display area may be displayed on any of the top, bottom, left or right side of the first display area.

Third Embodiment

Figure 7:
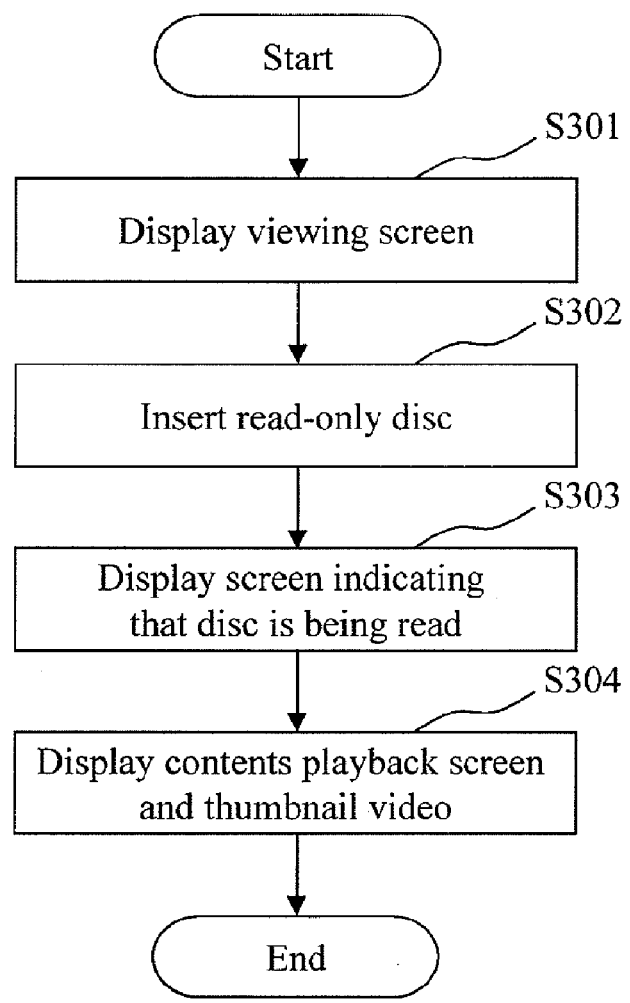
FIG. 7 is a flowchart for describing a processing flow in a third embodiment.

In addition to the configuration and operation according to the first and second embodiments, when a read-only optical disc is inserted, after completion of the preparation of the optical disc, the playback screen of the contents is displayed in a reduced size in the first display area, and the viewing screen of digital broadcast or the screen of external input contents or the like is displayed in the second display area as a thumbnail video. FIG. 7 is a flowchart for describing a flow of processing in this case. The processing will be described by also referring to the display screen examples shown in FIG. 8A to FIG. 8C.

Figure 8A:
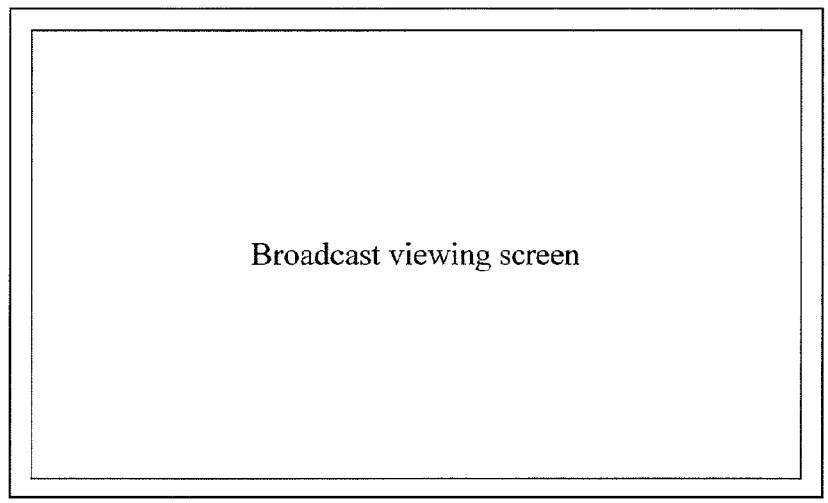
FIG. 8A to FIG. 8C are display screen examples in the third embodiment.
Figure 8B:
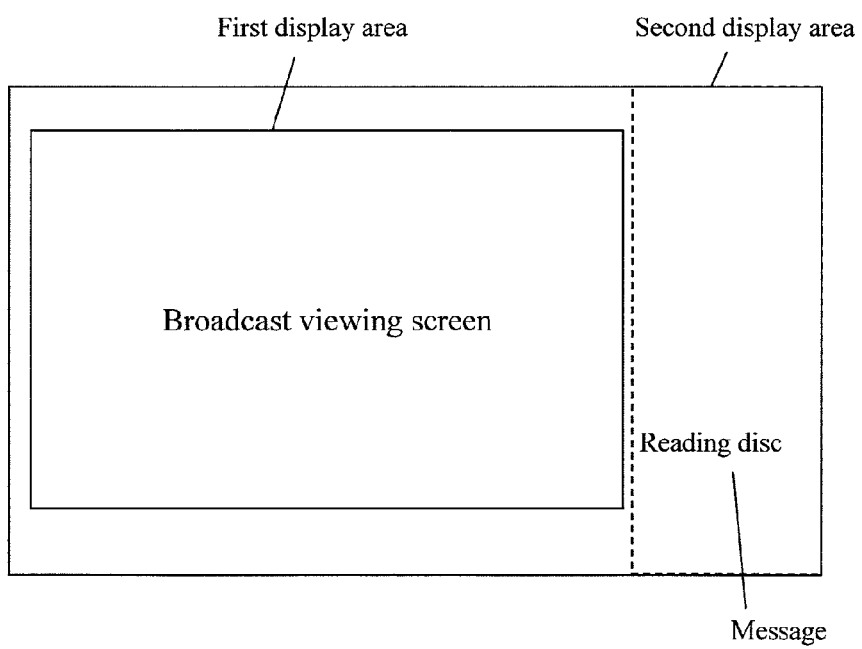
Figure 8C:
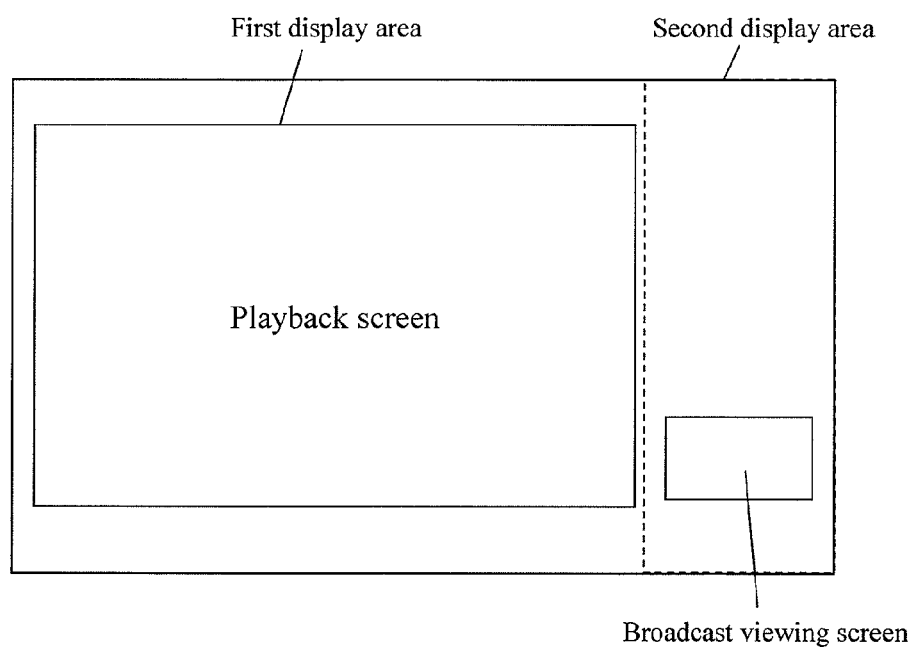

In step S301, suppose that the display unit 21 displays the viewing screen of digital broadcast with the single screen configuration as shown in FIG. 8A, for example. Then, in step S302, a read-only optical disc is inserted into the optical disc media driving unit 33, and reading of disc information or the like is performed. In step S303, the controller 25 causes the screen combining unit 17 to form a display screen of a double-screen configuration including a first display area and a second display area and causes the display unit 21 to display the display screen. Here, the first display area displays a viewing screen of digital broadcast in a reduced size, and the second display area displays a message indicating that the optical disc is being prepared, the message generated by the message generator 15. FIG. 8B shows an example of the display screen. Upon completion of the preparation for playback of the optical disc, in step S304, the controller 25 causes the screen combining unit 17 to faun a display screen of a double-screen configuration displaying a playback screen in a reduced size in a first display area and a viewing screen of digital broadcast in a second display area as a thumbnail video and causes the display unit 21 to display the display screen. Then, the controller 25 ends the processing. FIG. 8C shows an example of the display screen.

Fourth Embodiment

Figure 9:
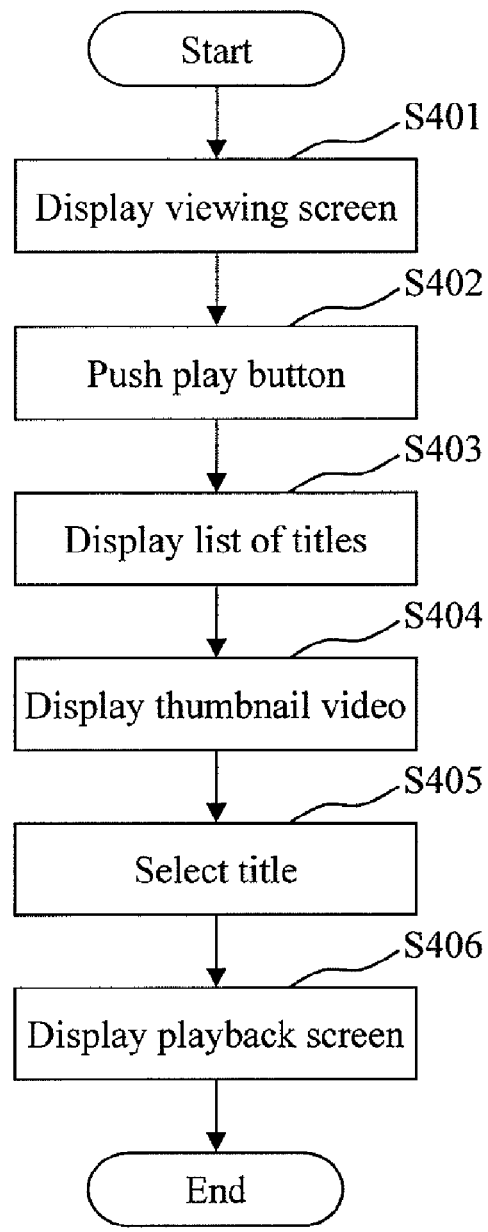
FIG. 9 is a flowchart for describing a processing flow in a fourth embodiment.

In addition to the configuration and operation according to the first to third embodiments, a playback screen of contents is displayed in a reduced size in the first display area and a list of titles of contents recorded in the optical disc or the storage device are displayed by pushing PLAY button or the like on the remote controller or the main body, in a state where the optical disc is inserted or where another recordable storage device such as a hard disk is connected. FIG. 9 is a flowchart for describing a flow of processing in this case. The processing will be described by also referring to the display screen examples shown in FIG. 10A to FIG. 10D. In this description, a case where an optical disc is inserted is described as an example.

Figure 10A:
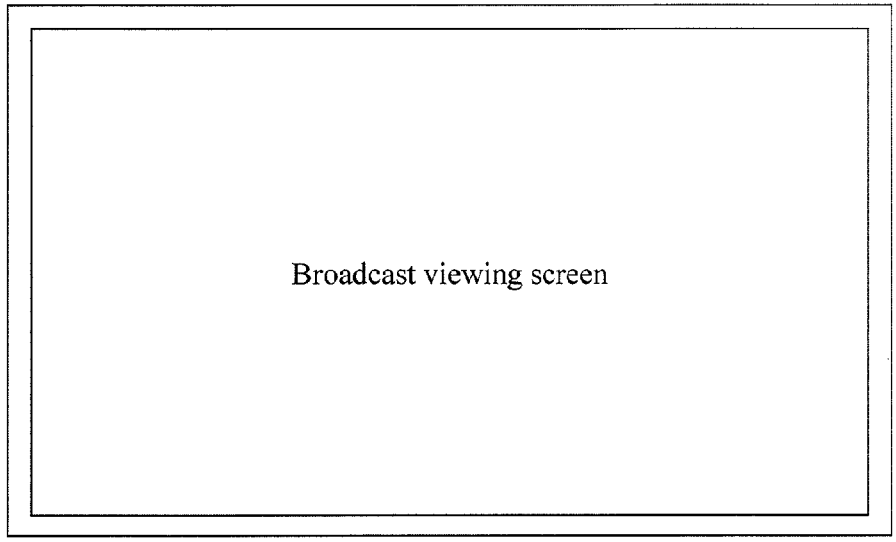
FIG. 10A to FIG. 10D are display screen examples in the fourth embodiment.
Figure 10B:
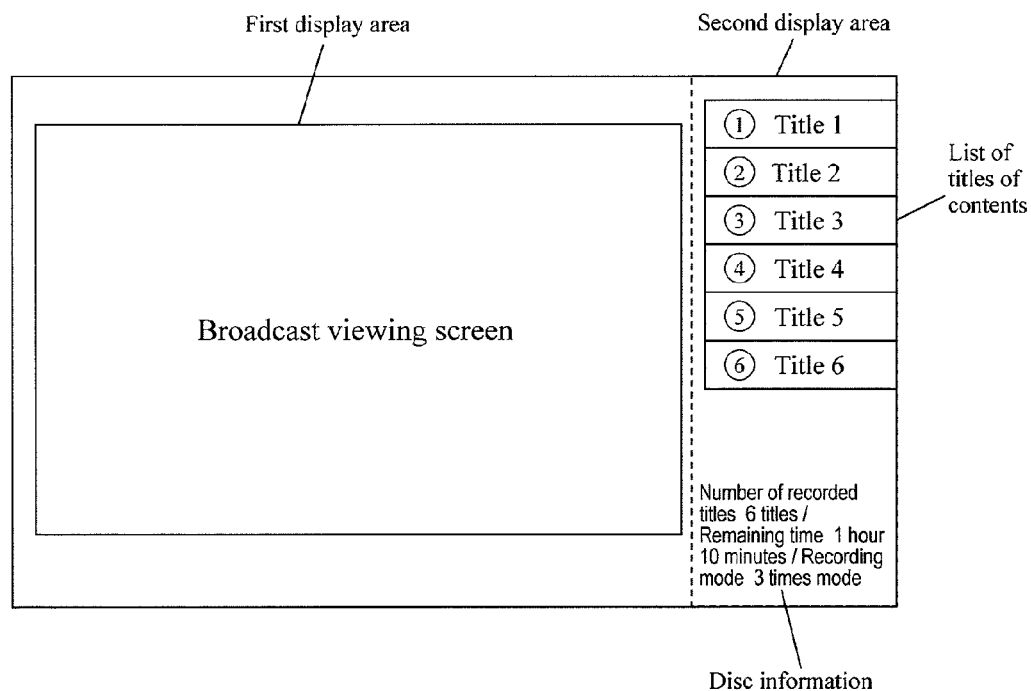

In step S401, suppose that the display unit 21 displays the viewing screen of digital broadcast with the single screen configuration as shown in FIG. 10A, for example. An optical disc including contents recorded therein is inserted into the optical disc media driving unit 33 at this point of time. PLAY button on the remote controller or the main body is pushed in step 402. In step S403, the controller 25 causes the screen combining unit 17 to form a display screen of a double-screen configuration including a first display area and a second display area and then causes the display unit 21 to display the display screen. Here, the first display area displays a viewing screen of digital broadcast in a reduced size. In addition, the titles of contents recorded in the optical disc are read and displayed as a list in the second display area. FIG. 10B shows an example of the display screen. Here, the titles of all of the contents recorded in the optical disc may be read first and then be displayed simultaneously. Otherwise, the titles of contents may be displayed one by one in the read order. In addition, when the individual titles of contents are displayed, each of the titles may be added an effect so that the title can be displayed as if it is inserted from the right side of the screen. Such an effect, display color, character size or the like may be set to be changeable based on an identification ID that can be set on the disc for each user. In a case where the same contents are recorded weekly, the contents may be collectively displayed as a single title. In addition, as shown in FIG. 10B, disc information such as the number of titles of recorded contents, the remaining time or the like may be displayed in the second display area.

Figure 10C:
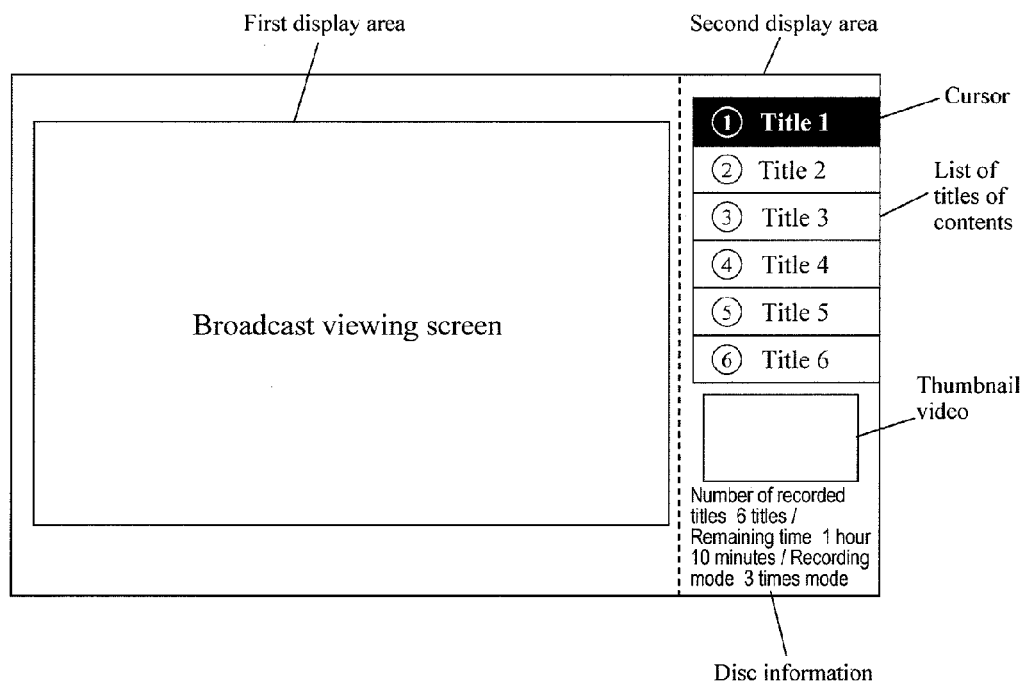

In the state shown in FIG. 10B, the cursor can be placed on the individual titles of the contents by operation of the cursor button on the remote controller or the like. In step S404, the controller 25 causes a playback screen of the contents of the title on which the cursor is placed to be displayed in the second display area as a thumbnail video. In this manner, the user can check the contents of the title. FIG. 10C shows an example of the display screen in this state. In the second display area, other than the thumbnail video, contents related information recorded while recording the contents may be displayed, or related contents may be displayed by EPG.

Figure 10D:
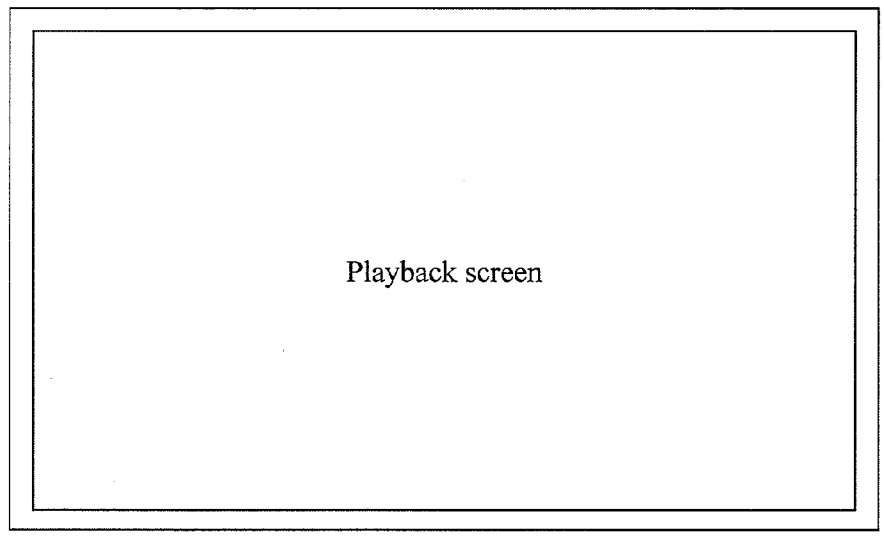

In step S405, when the user pushes a set button of the remote controller, for example, in a state where the cursor is placed on the desired title of contents, the desired title of contents is selected. In step S406, the controller 25 causes the playback screen of the contents of the selected title to be displayed with a single screen configuration as shown in FIG. 10D and ends the processing. As shown in the examples in FIG. 10B and FIG. 10C, a number may be assigned to each title of contents so as to allow the user to directly select the desired title of contents by pushing a numeric key on the remote controller.

Fifth Embodiment

Figure 11:
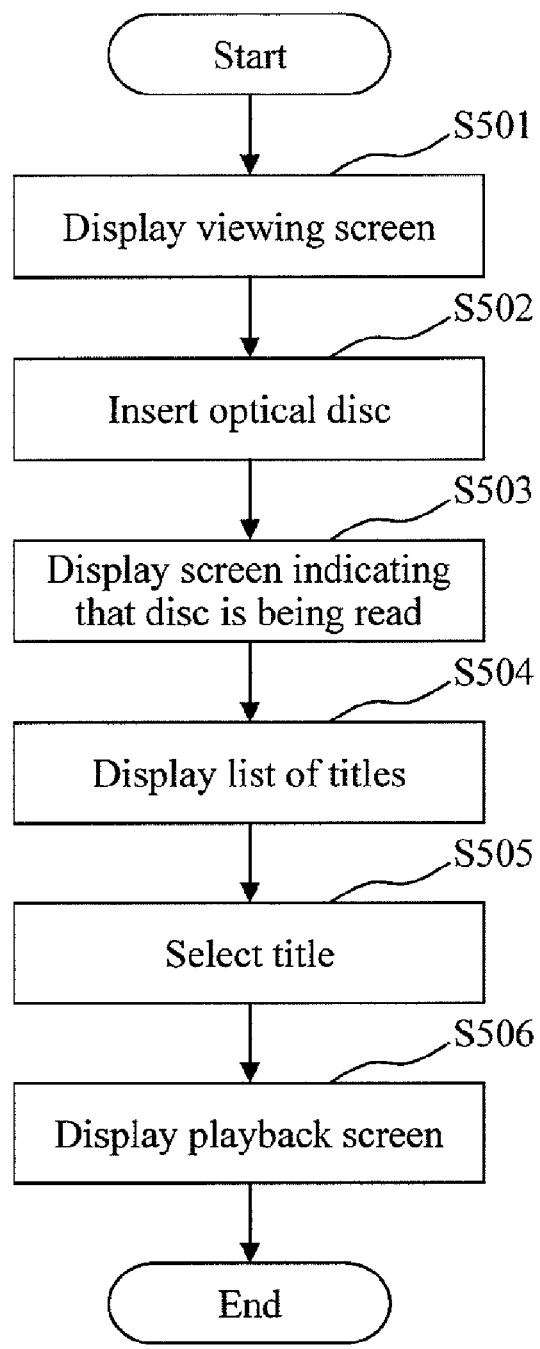
FIG. 11 is a flowchart for describing a processing flow in a fifth embodiment.

In the first embodiment, a playback screen of contents is displayed with the single screen configuration when a title of contents is selected from a list of titles of contents displayed in the second display area in the case of a recordable disc. However, in a fifth embodiment, the playback screen of the contents of the selected title is displayed in a reduced size in the first display area and the viewing screen of digital broadcast or the screen of external input contents or the like is displayed in the second display area as a thumbnail video. Here, the list of titles of contents recorded in the recordable optical disc may be kept displayed in the second display area. Furthermore, information on the recordable disc may also be displayed in the second display area. FIG. 11 is a flowchart for describing a flow of such processing. The processing will be described by also referring to display screen examples shown in FIG. 12A to FIG. 12E.

Figure 12A:
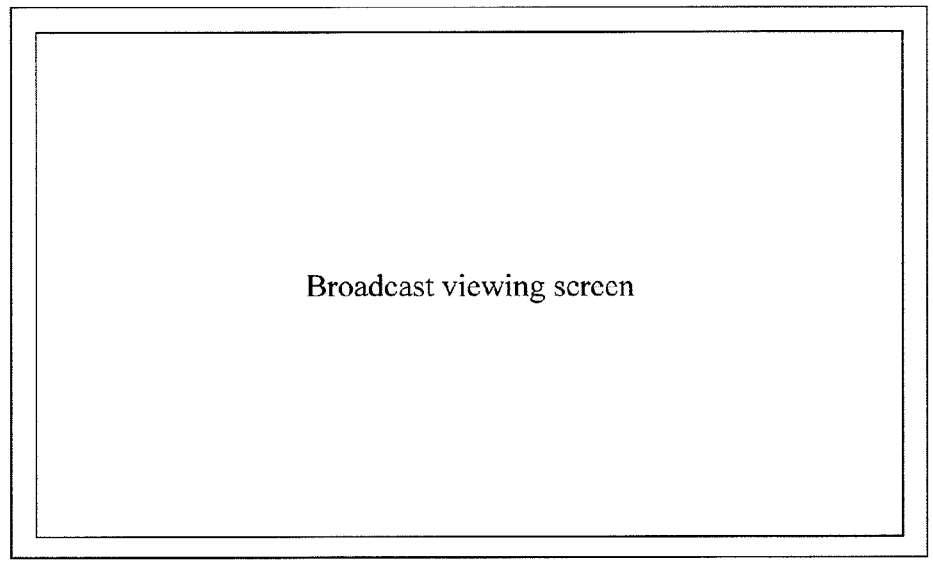
FIG. 12A to FIG. 12E are display screen examples in the fifth embodiment.
Figure 12B:
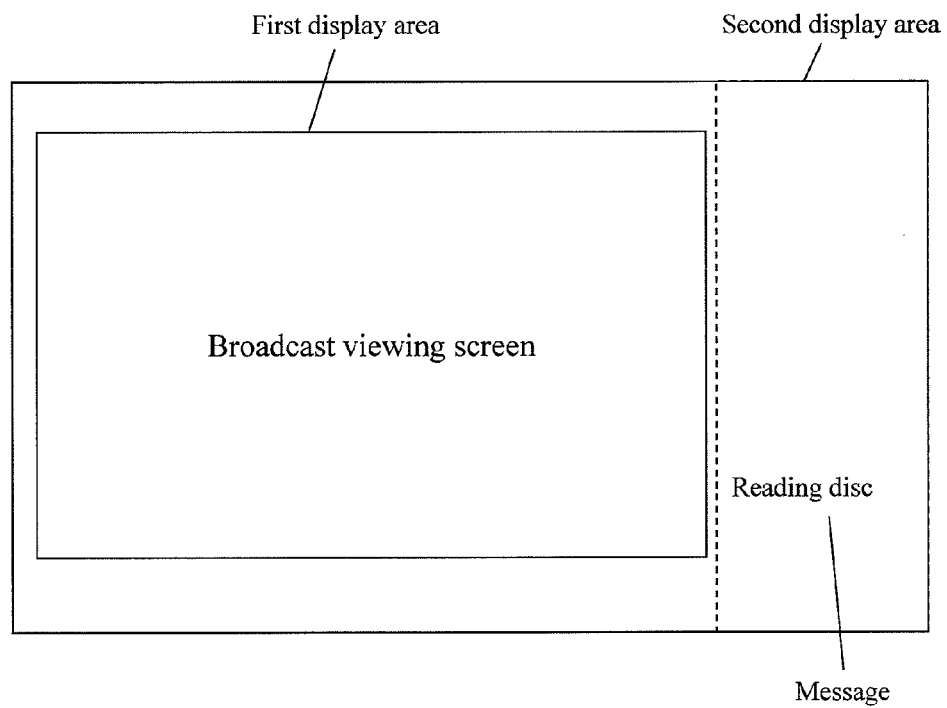

In step S501, suppose that the display unit 21 displays the viewing screen of digital broadcast with the single screen configuration as shown in FIG. 12A, for example. In step S502, an optical disc including contents recorded therein is inserted into the optical disc media driving unit 33, and reading of disc information or the like is performed. In step S503, the controller 25 causes the screen combining unit 17 to form a display screen of a double-screen configuration including a first display area and a second display area and then causes the display unit 21 to display the display screen. Here, the first display area displays the viewing screen of digital broadcast in a reduced size, and the second display area displays a message indicating that the optical disc is being prepared, the message generated by the message generator 15. FIG. 12B shows an example of the display screen. In step S504, the titles of contents recorded in the optical disc are read and displayed in the second display area. Here, the titles of all of the contents recorded in the optical disc may be read first and then be displayed simultaneously. Otherwise, the titles of contents may be displayed one by one in the read order. In addition, when the individual titles of the contents are displayed, each of the titles may be added an effect so that the title can be displayed as if it is inserted from the right side of the screen. Such an effect, display color, character size or the like may be set to be changeable based on an identification ID that can be set on the disc for each user.

Figure 12C:
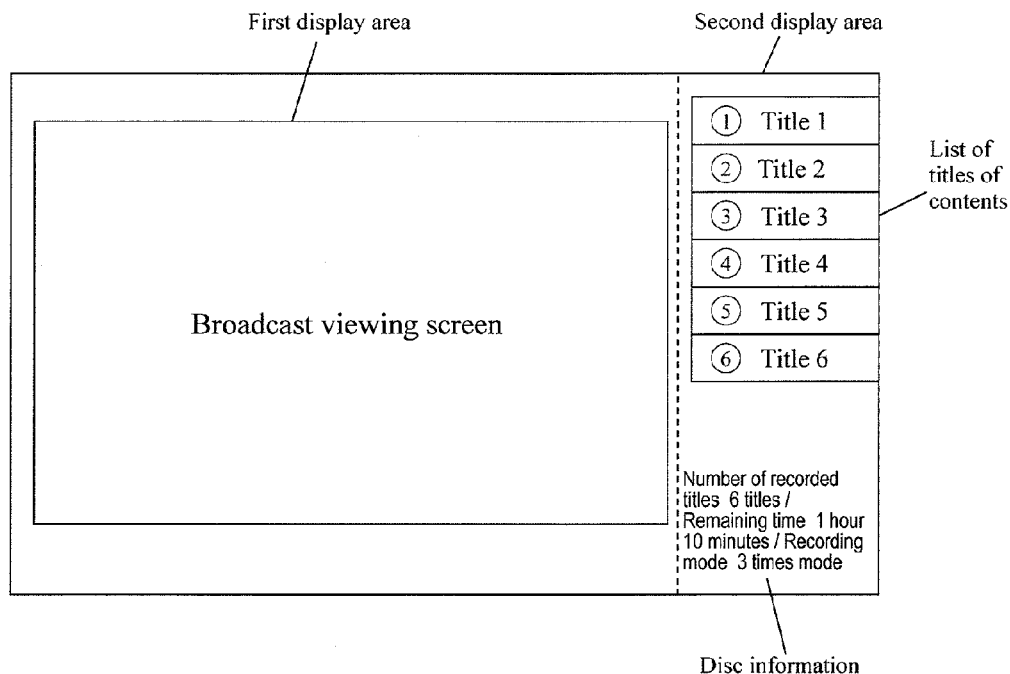
Figure 12D:
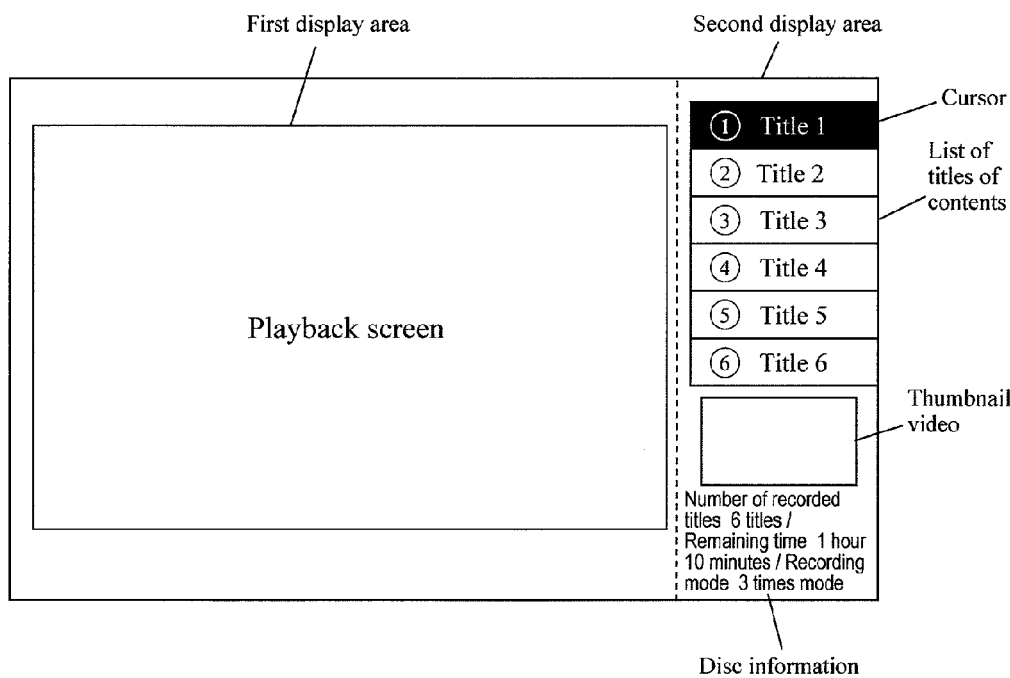
Figure 12E:
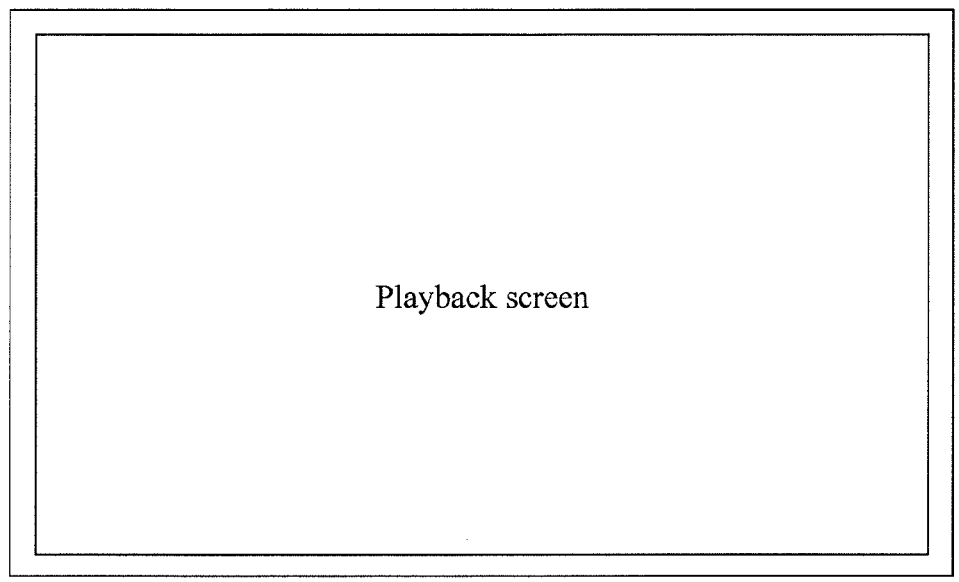

An example of the display screen in which the titles of all of the contents are displayed is shown in FIG. 12C. In a case where the same contents are recorded weekly, the contents may be collectively displayed as a single title. In addition, as shown in FIG. 12C, disc information such as the number of titles of recorded contents, the remaining time or the like may be displayed in the second display area. In the state shown in FIG. 12C, the cursor can be placed on each of the titles of contents by operation of CURSOR button or the like on the remote controller. In step S505, the controller 25 causes the playback screen of contents of the title on which the cursor is placed to be displayed in a reduced size in the first display area, and causes the viewing screen of digital broadcast, the screen of external input contents or the like in the second display area as a thumbnail video. Here, the list of titles of contents recorded in the recordable optical disc may be kept displayed in the second display area. Furthermore, information on the recordable optical disc may also be kept displayed in the second display area. FIG. 12D shows an example of the display screen. In step S506, when a set button of the remote controller is pushed while the cursor is placed on the title of contents, for example, the controller 25 causes the playback screen of the contents to be displayed with a single screen configuration as shown in FIG. 12E and ends the processing.

Sixth Embodiment

Figure 13:
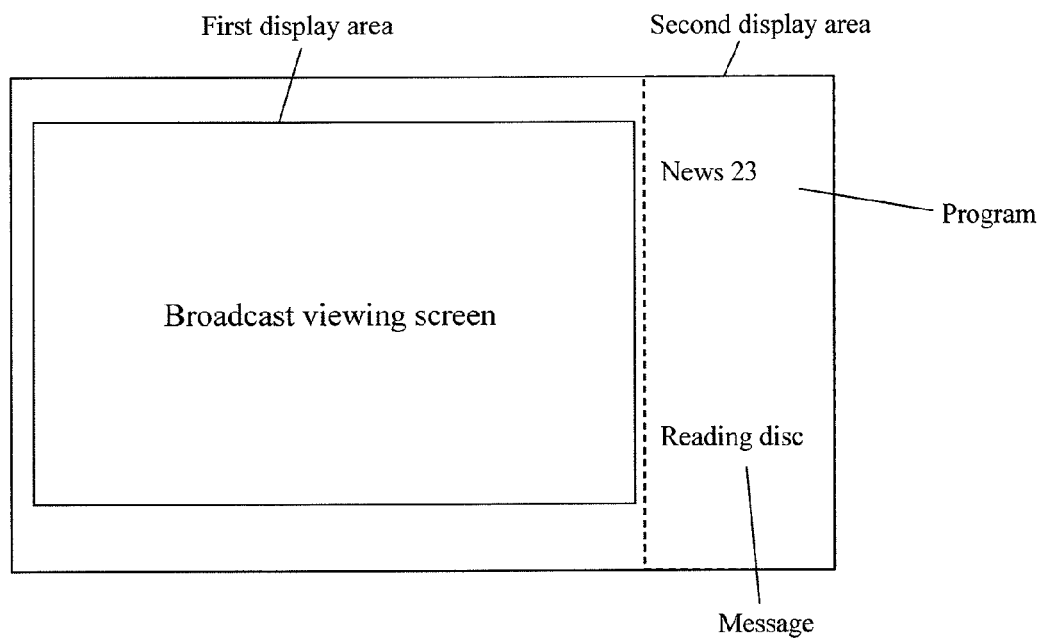
FIG. 13 is a display screen example in a sixth embodiment.
Figure 14:
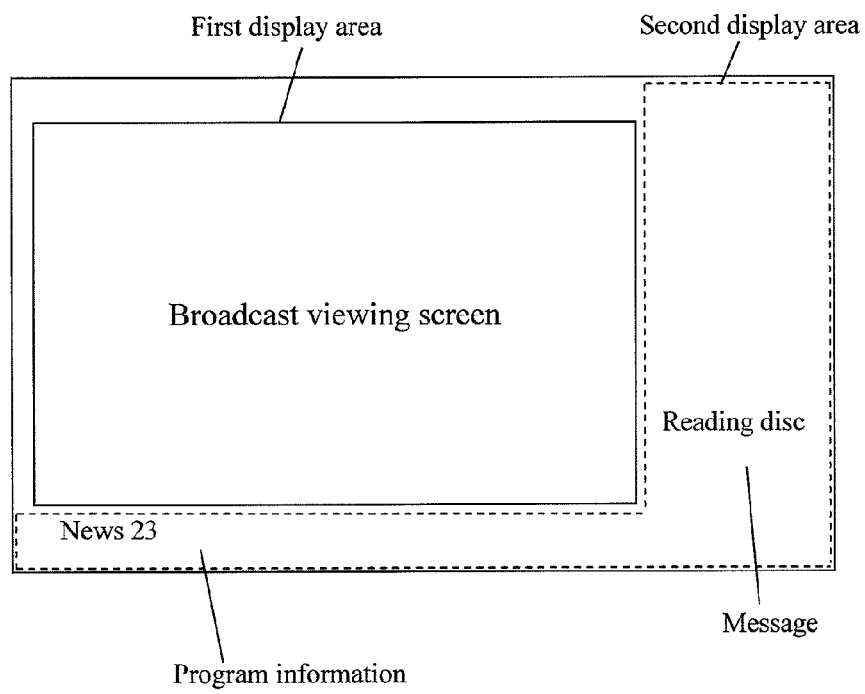
FIG. 14 is another display screen example in the sixth embodiment.

In a sixth embodiment, while the disc is read and prepared in the first or fifth embodiment, the viewing screen of digital broadcast currently viewed is displayed in a reduced size in the first display area, and program information on the currently viewed digital broadcast is displayed in the second display area in addition to the message indicating that the optical disc is being read. FIG. 13 shows an example of the display screen. In addition, it is possible to arrange the second display area also on the top, bottom or left side of the first display area instead of arranging the second display area only on the right side of the first display area as shown in FIG. 13. FIG. 14 shows an example of a screen in which the second display area is arranged on the right and bottom sides of the first display area, and the message indicating that the optical disc is being read is displayed on the right side of the first display area while the program information is displayed on the bottom side of the first display area.

INDUSTRIAL APPLICABILITY

The present invention is applicable to a digital broadcast receiver.

The invention claimed is:

1. A digital broadcast receiver capable of recording and playing back contents in an optical disc, comprising:
the receiver comprises a controller configured to determine whether an optical disc inserted into the receiver is a read-only optical disc or a recordable optical disc and also to control a display screen, wherein
the controller is configured to cause a display screen including a first display area and a second display area to be displayed responsive to insertion of an optical disc, the first display area displaying digital broadcast or external input contents, the second display area displaying a message indicating that the optical disc is being prepared; and
the controller is configured to cause only a playback screen of contents recorded in the optical disc to be displayed upon completion of the preparation of the optical disc in a case where the optical disc is a read-only optical disc.

2. A digital broadcast receiver capable of recording and playing back contents in an optical disc, comprising:
a controller configured to determine whether an optical disc inserted into the receiver is a read-only optical disc or a recordable optical disc and also to control a display screen, wherein
the controller is configured to cause a display screen including a first display area and a second display area to be displayed responsive to insertion of an optical disc, the first display area displaying digital broadcast or external input contents, the second display area displaying a message indicating that the optical disc is being prepared;
the controller is configured to cause a list of titles of contents recorded in the optical disc to be further displayed in the second display area in a case where the optical disc is a recordable disc; and
the controller deletes the message in the second display area upon completion of the preparation of the optical disc.

3. A digital broadcast receiver capable of recording and playing back contents in an optical disc, comprising:
a controller configured to determine whether an optical disc inserted into the receiver is a read-only optical disc or a recordable optical disc and also to control a display screen;
the controller is configured to cause a display screen including a first display area and a second display area to be displayed responsive to insertion of an optical disc, the first display area displaying digital broadcast or external input contents, the second display area displaying a message indicating that the optical disc is being prepared,
the controller is configured to cause only a playback screen of contents recorded in the optical disc to be displayed upon completion of the preparation of the optical disc in a case where the optical disc is a read-only optical disc;
the controller is configured to cause a list of titles of contents recorded in the optical disc to be further displayed in the second display area in a case where the optical disc is a recordable disc; and
the controller deletes the message in the second display area upon completion of the preparation of the optical disc.

4. The digital broadcast receiver according to claim 2, wherein only a display screen of the contents of the selected title is displayed responsive to selection of a predetermined title of contents from the list of titles of contents displayed in the second display area.

5. The digital broadcast receiver according to claim 2, wherein a cursor is configured to be displayed in the list of titles of contents displayed in the second display area, and a thumbnail video of contents of the title on which the cursor is placed is further configured to be displayed in the second display area.

6. The digital broadcast receiver according to claim 2, wherein an external appearance of the list of titles of contents to be displayed in the second display area is configured to be changed on the basis of an identification ID recorded in the optical disc.

7. A method for controlling a display screen of a digital broadcast receiver capable of recording and playing back contents in an optical disc, the method comprising:
causing a display screen including a first display area and a second display area to be displayed responsive to insertion of an optical disc, the first display area displaying digital broadcast or external input contents, the second display area displaying a message indicating that the optical disc is being prepared;
determining whether the inserted optical disc is a read-only optical disc or a recordable optical disc;

displaying only a playback screen of contents recorded in the optical disc upon completion of the preparation of the optical disc in a case where the optical disc is a read-only optical disc;

causing a list of titles of contents recorded in the optical disc to be further displayed in the second display area in a case where the optical disc is a recordable disc; and deleting the message in the second display area upon completion of the preparation of the disc in a case where the optical disc is a recordable disc.

8. A tangible computer-readable storage medium having a set of computer-executable instructions embodied thereon for performing a method of controlling a display screen, the method comprising:

causing a display screen including a first display area and a second display area to be displayed responsive to insertion of an optical disc, the first display area displaying digital broadcast or external input contents, the second display area displaying a message indicating that the optical disc is being prepared;

determining whether the inserted optical disc is a read-only optical disc or a recordable optical disc;

displaying only a playback screen of contents recorded in the optical disc upon completion of the preparation of the optical disc in a case where the optical disc is a read-only optical disc;

causing a list of titles of contents recorded in the optical disc to be further displayed in the second display area in a case where the optical disc is a recordable disc; and deleting the message in the second display area upon completion of the preparation of the disc in a case where the optical disc is a recordable disc.

9. A digital broadcast receiver comprising:

a screen configured to be displayed while the receiver is being switched between a first display mode and a second display mode and responsive to insertion of a disc and a determination of whether the disc is a read-only disc or a recordable optical disc, the first display mode configured to display a viewing screen of a broadcast program or a playback screen of contents in full screen, the second display mode configured to display a display screen including a first display area and a second display area other than the first display area, the first display area configured to display the viewing screen of the broadcast program or the playback screen of contents in a reduced size.

10. A digital broadcast receiver configured to record and play back contents in a built-in storage device and/or a connected external storage device, comprising:

a screen configured to be displayed while the receiver is being switched between a first display mode and a second display mode, wherein the first display mode is configured to display a viewing screen of a broadcast program or a playback screen of contents in full screen, and the second display mode is configured to display a display screen including a first display area and a second display area other than the first display area, the first display area configured to display the viewing screen of the broadcast program or the playback screen of contents in a reduced size;

in the second display mode, a list of titles of contents recorded in the storage device configured to be displayed in the second display area; and a playback screen of contents of the title selected from the list of titles of contents configured to be displayed in the first display mode.

11. The digital broadcast receiver according to claim 10, wherein information on the storage device is further configured to be displayed in the second display area.

12. The digital broadcast receiver according to claim 10, wherein a thumbnail video of the playback screen of the contents recorded in the storage device is further configured to be displayed in the second display area.

13. A digital broadcast receiver capable of playing back a read-only optical disc, comprising:

a screen configured to be displayed while the receiver is being switched between a first display mode and a second display mode, the first display mode is configured to display a viewing screen of a broadcast program or a playback screen of contents in full screen, the second display mode is configured to display a display screen including a first display area and a second display area other than the first display area, the first display area is configured to display the viewing screen of the broadcast program or the playback screen of contents in a reduced size;

the screen is configured to be displayed in the second display mode responsive to insertion of a read-only optical disc, so that until the preparation of the playback is completed, a viewing screen of a broadcast program or a content screen which is displayed in the first display mode before the optical disc is inserted is displayed in the first display area, while a message indicating that the optical disc is being read is displayed in the second display area; and a playback screen of the read-only optical disc is configured to be displayed in the first display area responsive to completion of the preparation of playback of the read-only optical disc, and a thumbnail video of the viewing screen of the broadcast program is configured to be displayed in the second display area.

14. A digital broadcast receiver configured to record and play back contents in an optical disc, comprising:

a screen configured to be displayed while the receiver is being switched between a first display mode and a second display mode, the first display mode is configured to display a viewing screen of a broadcast program or a playback screen of contents in full screen, the second display mode is configured to display a display screen including a first display area and a second display area other than the first display area, the first display area displaying is configured to display the viewing screen of the broadcast program or the playback screen of contents in a reduced size;

the screen is configured to be displayed in the second display mode responsive to a predetermined user operation being performed on a remote controller or a main body operation unit in a state where the optical disc including contents recorded therein is inserted, so that a viewing screen of a broadcast program or a content screen which is configured to be displayed in the first display mode before the user operation is performed is displayed in the first display area, while a list of titles of contents recorded in the optical disc is displayed in the second display area; and a playback screen of contents of the title selected from the list of titles of contents is configured to be displayed in the first display mode.

15. The digital broadcast receiver according to claim 14, wherein information on the optical disc is further configured to be displayed in the second display area.

16. The digital broadcast receiver according to claim 14, wherein a thumbnail video of the playback screen of contents recorded in the optical disc is configured to be displayed in the second display area.

17. A digital broadcast receiver configured to record and play back contents in a connected external storage device, comprising:
- a screen configured to be displayed while the receiver is being switched between a first display mode and a second display mode, the first display mode is configured to display a viewing screen of a broadcast program or a playback screen of contents in full screen, the second display mode is configured to display a display screen including a first display area and a second display area other than the first display area, the first display area is configured to display the viewing screen of the broadcast program or the playback screen of contents in a reduced size;
- the screen is configured to be displayed in the second display mode responsive to a predetermined user operation being performed on a remote controller or a main body operation unit in a state where the storage device including contents recorded therein is connected, so that a viewing screen of a broadcast program or a content screen which is configured to be displayed in the first display mode before the user operation is performed is displayed in the first display area, while a list of titles of contents recorded in the storage device is displayed in the second display area; and
- a playback screen of contents of the title selected from the list of titles of contents is configured to be displayed in the first display mode.

18. The digital broadcast receiver according to claim 17, wherein information on the storage device is further configured to be displayed in the second display area.

19. The digital broadcast receiver according to claim 17, wherein a thumbnail video of the playback screen of contents recorded in the storage device is configured to be displayed in the second display area.

20. A digital broadcast receiver configured to record and play back contents in a built in or connected storage device, comprising:
- a screen, configured to be displayed while the receiver is being switched between a first display mode and a second display mode, the first display mode is configured to display a viewing screen of a broadcast program or a playback screen of contents in full screen, the second display mode is configured to display a display screen including a first display area and a second display area other than the first display area, the first display area is configured to display the viewing screen of the broadcast program or the playback screen of contents in a reduced size; and
- the screen is configured to be displayed in the second display mode responsive to the storage device including contents recorded therein being started, so that a playback screen of contents selected from the contents recorded in the storage device is configured to be displayed in the first display area, while a thumbnail video of the viewing screen of the broadcast program or the content screen which is displayed in the first display mode before the storage device is started is configured to be displayed in the second display area.

21. The digital broadcast receiver according to claim 20, wherein a list of titles of contents recorded in the storage device is further configured to be displayed in the second display area.

22. The digital broadcast receiver according to claim 20, wherein information on the storage device is further configured to be displayed in the second display area.

23. A digital broadcast receiver configured to record and play back contents in an optical disc, comprising:
- a screen configured to be displayed while the receiver is being switched between a first display mode and a second display mode, the first display mode is configured to display a viewing screen of a broadcast program or a playback screen of contents in full screen, the second display mode is configured to display a display screen including a first display area and a second display area other than the first display area, the first display area is configured to display the viewing screen of the broadcast program or the playback screen of contents in a reduced size; and
- the screen is configured to be displayed in the second display mode responsive to insertion of an optical disc, so that until preparation of playback or recording is completed, the viewing screen of the broadcast program or the content screen which is displayed in the first display mode before the optical disc is inserted is configured to be displayed in the first display area, while a message indicating that the optical disc is being read and information on the broadcast program or the contents displayed in the first display area are configured to be displayed in the second display area.

* * * * *